(12) United States Patent
McFadden

(10) Patent No.: US 11,535,545 B2
(45) Date of Patent: Dec. 27, 2022

(54) ANAEROBIC AND AEROBIC TREATMENT SYSTEM AND PROCESS FOR LANDFILL WASTEWATER

(71) Applicant: McFadden Engineering, Inc., Mobile, AL (US)

(72) Inventor: A. Frank McFadden, Mobile, AL (US)

(73) Assignee: McFadden Engineering, Inc., Mobile, AL (US)

( * ) Notice: Subject to any disclaimer, the term of this patent is extended or adjusted under 35 U.S.C. 154(b) by 20 days.

(21) Appl. No.: 17/170,486

(22) Filed: Feb. 8, 2021

(65) Prior Publication Data

US 2021/0246058 A1 Aug. 12, 2021

Related U.S. Application Data

(60) Provisional application No. 62/971,699, filed on Feb. 7, 2020.

(51) Int. Cl.

| | |
|---|---|
| *C02F 3/30* | (2006.01) |
| *C02F 3/28* | (2006.01) |
| *C02F 3/10* | (2006.01) |
| *C02F 3/20* | (2006.01) |
| *C02F 9/00* | (2006.01) |
| C02F 103/06 | (2006.01) |
| C02F 1/00 | (2006.01) |
| C02F 1/78 | (2006.01) |
| C02F 101/30 | (2006.01) |

(52) U.S. Cl.
CPC ................ *C02F 9/00* (2013.01); *C02F 1/78* (2013.01); *C02F 3/108* (2013.01); *C02F 3/208* (2013.01); *C02F 3/2806* (2013.01); *C02F 3/2866* (2013.01); *C02F 3/30* (2013.01); *C02F 2001/007* (2013.01); *C02F 2101/30* (2013.01); *C02F 2103/06* (2013.01); *C02F 2303/16* (2013.01)

(58) Field of Classification Search
CPC .... C02F 9/00; C02F 1/78; C02F 3/108; C02F 3/208; C02F 3/2806; C02F 3/2866; C02F 3/30; C02F 2001/007; C02F 2103/06; C02F 2303/16
USPC ........................................................ 210/605
See application file for complete search history.

(56) References Cited

U.S. PATENT DOCUMENTS

| | | |
|---|---|---|
| 4,902,429 A | 2/1990 | Carpenter et al. |
| 4,908,128 A | 3/1990 | China |
| 4,915,829 A | 4/1990 | Long |
| 5,062,958 A | 11/1991 | Bateson et al. |
| 5,500,112 A | 3/1996 | McDonald |
| 5,582,732 A | 12/1996 | Mao |

(Continued)

FOREIGN PATENT DOCUMENTS

| | | |
|---|---|---|
| CN | 101391849 A | 3/2009 |
| CN | 201381255 Y | 1/2010 |

(Continued)

OTHER PUBLICATIONS

Xu et al, CN 109368928, English machine translation, pp. 1-8 (Year: 2019).*

*Primary Examiner* — Claire A Norris
(74) *Attorney, Agent, or Firm* — Breiner & Breiner, L.L.C.

(57) ABSTRACT

There is disclosed a system and process for the anaerobic and aerobic treatment of landfill wastewater, including landfill condensate, landfill leachate and mixtures thereof.

20 Claims, 10 Drawing Sheets

(56) References Cited

U.S. PATENT DOCUMENTS

| | | |
|---|---|---|
| 5,647,977 A | 7/1997 | Arnaud |
| 5,783,069 A | 7/1998 | Frank |
| 5,868,937 A | 2/1999 | Back et al. |
| 6,068,003 A | 5/2000 | Kosofsky et al. |
| 6,210,578 B1 | 4/2001 | Sagastume et al. |
| 6,303,025 B1 | 10/2001 | Houchens |
| 6,666,977 B2 | 12/2003 | Seidl |
| 6,719,912 B2 | 4/2004 | Seidl |
| 6,966,983 B1 | 11/2005 | McWhirter et al. |
| 7,147,784 B2 | 12/2006 | Seidl |
| 7,220,361 B2 | 5/2007 | Seidl |
| 7,224,355 B2 | 7/2007 | Green |
| 7,520,980 B2 | 4/2009 | Monosov et al. |
| 7,731,852 B2 | 6/2010 | Monosov |
| D645,159 S | 9/2011 | Loken |
| D645,160 S | 9/2011 | Loken |
| D645,161 S | 9/2011 | Loken |
| 8,092,678 B2 | 1/2012 | Ott |
| D661,778 S | 6/2012 | Dempster et al. |
| 8,764,986 B2 | 7/2014 | Johnson et al. |
| 9,896,363 B2 | 2/2018 | Seidl et al. |
| 2005/0184011 A1 | 8/2005 | Fields |
| 2005/0230294 A1 | 10/2005 | Seidl |
| 2005/0258084 A1 | 11/2005 | Burks |
| 2006/0070858 A1 | 4/2006 | de Swardt et al. |
| 2007/0186962 A1 | 8/2007 | Niedzwiecki et al. |
| 2007/0207534 A1 | 9/2007 | Jones et al. |
| 2008/0245731 A1* | 10/2008 | Monosov ............... C02F 3/103 210/615 |
| 2010/0282654 A1 | 11/2010 | Hauschild |
| 2011/0068057 A1 | 3/2011 | Haley, III et al. |
| 2012/0055869 A1 | 3/2012 | Gardiner et al. |
| 2012/0152832 A1 | 6/2012 | Johnson et al. |
| 2015/0014246 A1* | 1/2015 | Mcfadden ............... C02F 3/20 210/615 |
| 2017/0158534 A1* | 6/2017 | Sorensen ............... C02F 3/08 |

FOREIGN PATENT DOCUMENTS

| | | | |
|---|---|---|---|
| CN | 109368928 A | * | 2/2019 |
| JP | H09024383 A | | 1/1997 |

* cited by examiner

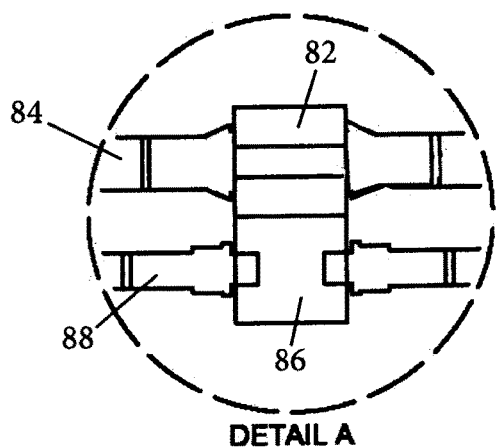
DETAIL A
FIG. 5E
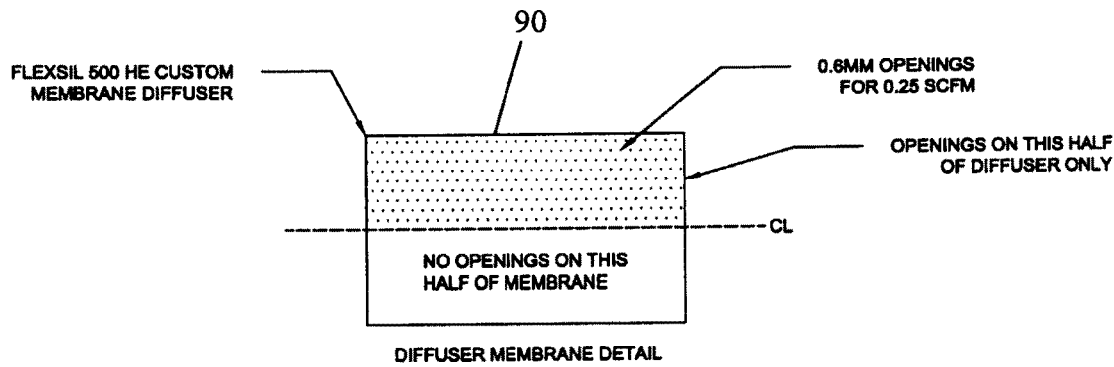
DIFFUSER MEMBRANE DETAIL
FIG. 5F
FIG. 5G
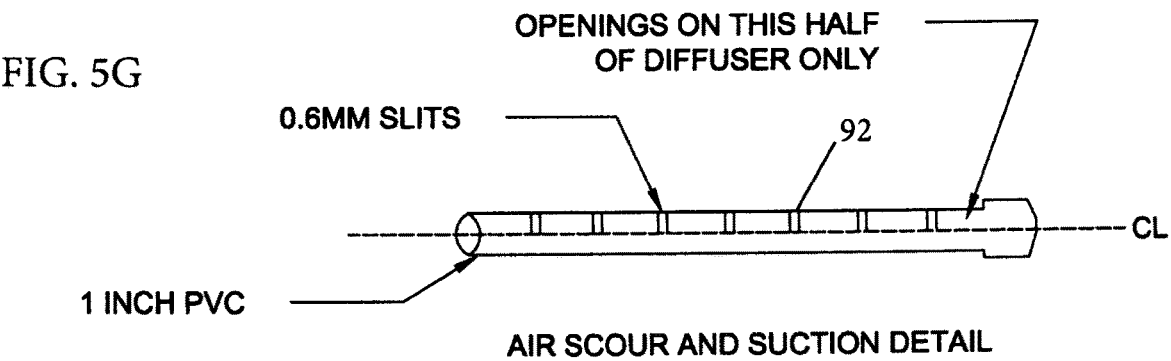
AIR SCOUR AND SUCTION DETAIL

ANAEROBIC AND AEROBIC TREATMENT SYSTEM AND PROCESS FOR LANDFILL WASTEWATER

RELATED APPLICATION

This application claims benefit of U.S. provisional application Ser. No. 62/971,699, filed Feb. 7, 2020, entitled "Anaerobic And Aerobic Treatment Apparatus And Process For Landfill Wastewater," which application is incorporated herein by reference in its entirety.

FIELD OF THE INVENTION

The present invention relates to an anaerobic and aerobic treatment system and process for landfill wastewater. More particularly, the invention relates to a system and processes for the anaerobic and aerobic treatment of landfill condensate, landfill leachate or a mixture thereof.

BACKGROUND OF THE INVENTION

Municipal and industrial landfills in the United States are known for generating pollutants in both the gaseous and liquid phases. As precipitation falls on the landfill some of it percolates into the soil and leaches through the waste cells generating a liquid (leachate) that is captured and processed. The waste that is contained within the landfill will eventually degrade by a process known as anaerobic digestion that generates gaseous pollutants including methane. The industry has recognized that this methane produced within the landfill can be collected, cleaned, and used as a biofuel to run turbines that generate electricity and other machinery in lieu of more expensive energy sources. The gas cleaning process generates wastewater as a biproduct, i.e., condensate that contains some high-strength organic compounds that require treatment before discharging to the environment and/or being re-used in such processes as cooling towers, irrigation applications, wash water, and the like.

Various apparatus and processes are known for the treatment of wastewater. One particularly superior wastewater treatment apparatus and process is the OxyShark® system sold by Water Reclamation Solutions, LLC of Mobile, Alabama and the subject of pending U.S. patent application Ser. No. 14/211,543, filed Mar. 14, 2014, entitled "Wastewater Treatment Apparatus And Process Therefor," which application is incorporated herein by reference in its entirety. The OxyShark® system may be used to treat landfill wastewater and particularly landfill condensate and/or landfill leachate. However, improvements to the system may be made.

SUMMARY OF THE INVENTION

The invention is directed to the treatment of landfill condensate, landfill leachate or a mixture thereof. The invention will be explained herein with respect to landfill condensate ("condensate") with the understanding that it is also useful in the treatment of a mixture of condensate and landfill leachate and landfill leachate. Specifically, the invention is directed to the treatment of condensate by first using an anaerobic apparatus and process and thereafter treating the pretreated condensate with an aerobic apparatus and process utilizing high purity oxygen in the range of about 90 to 96% using the OxyShark® system.

Anaerobic biological treatment is known to treat high-strength organic wastewater. Some of the advantages of this process are (1) it generates a useable biproduct, methane gas, that can be used as an energy source; (2) a high degree of waste stabilization can be accomplished while producing only a small amount of excess biomass; and (3) the total energy required to run the process is a small fraction when compared to an aerobic process that requires oxygen addition by mechanical means, e.g. blowers, compressors, oxygen concentrators and the like; all of the above while reducing chemical oxygen demand (COD) and biological oxygen demand (BOD) by about 70 to 80%.

The anaerobic treatment system of the invention includes an anaerobic treatment tank having bio-growth media for microbes to grow and degrade the wastewater and stabilize the waste. Such media may be made from various plastics, polymers, textiles, and any material that has a high surface area to volume ratio and compatible with the anaerobic environment. A typical media may be made from high-density polyethylene with a surface area to volume ratio of 100 to 230 square feet/cubic foot of media. The media may be in the form of small units whereby hundreds or thousands of these units are used in a single reactor, e.g. a 1-inch×1-inch cylindrical or about a 1-inch diameter sphere. The process is called a moving-bed bio-reactor (MBBR).

The aerobic treatment system of the invention utilizes the OxyShark® process. This process is characterized by utilizing a fixed-film or attached growth process with plug flow hydraulics and high-purity oxygen, e.g. in the range of about 90 to 96%, and preferably 94%. The system supports microbial respiration resulting in a high-rate biological reactor within a small footprint.

Characteristics of the treated effluent from the anaerobic MBBR will meet COD<5,000 mg/L and BOD<2,500 mg/L, or better. However, the total suspended solids (TSS), which is primarily composed of dead bacterial cells that are dislodged from the media surfaces, is in the range <1,000 mg/L. This water is then treated by a secondary aerobic polishing, the OxyShark® system, to meet <500 mg/L or better BOD and and <2,000 mg/L or better COD. A secondary clarifier may be used, if necessary, to bring the TSS to acceptable effluent standards for reuse of the wastewater.

While several of the above issues are challenging, the system of the invention overcomes several constraints as it offers specific advantages over the currently available anaerobic reactor and aerobic reactor configurations, including, but not limited to, the following: (1) ease of anaerobic solid-liquid-gas separation; (2) robustness against toxic or shock loads; (3) resiliency to peak flows and loads; (4) easy recovery from washout situations as attached growth provides an inventory of biomass; (5) ability to perform under footprint constraints; (6) ability for easy retrofit to upgrade existing installations; (7) enhanced sludge retention time (SRT) significantly without requiring additional footprint; and (8) user friendly operation.

Accordingly, municipal or industrial landfill condensate wastewater effluent is a high-strength and readily biodegradable waste and is an ideal candidate for the anaerobic treatment followed by aerobic treatment of the invention over an aerobic treatment process alone.

The system of the invention is directed to the treatment of landfill condensate and to reduce the amount of pollutants to at least less than 500 mg/L BOD and 2,000 mg/L COD. The system comprises the following apparatus and processes. Condensate is fed to an equalization tank. From the equalization tank the condensate is moved to an anaerobic treatment tank. The influent condensate enters the tank at the bottom of the tank. The tank includes bio-growth media, preferably comprising numerous small units have a surface area to volume ratio of about 100 to 230 ft$^2$/ft$^3$, and which fills the tank in the range of 30 to 50% by volume, preferably 35 to 40% by volume. The influent condensate is treated in the anaerobic tank for about at least 60 hours until the condensate pollutant level is reduced to at least about 2,500 mg/L BOD and 5,000 mg/L COD. The tank includes a mixing system comprising a plurality of mixing nozzles vertically aligned to mix the condensate. After treatment in the anaerobic tank the anaerobic treated condensate is moved to an aerobic treatment reactor, the reactor preferably is a modular system comprising a plurality of OxyShark® tanks.

The OxyShark® tanks comprise an enclosed wastewater treatment tank utilizing a continuous channel plug flow process for treating the pre-treated condensate and providing a treated effluent condensate. The aerobic reactor may include a plurality of tanks, i.e. a modular system, each having a bottom wall, side walls, a first end wall, a second end wall and a cover providing access to the inside of the tank. The cover is adapted to enclose the wastewater treatment tank to keep nearly pure oxygen, 90 to 96% purity, enclosed in the tank when in operation. This provides for a fully aerobic system, thereby providing for a higher pollutant removal rate due to the high oxygen concentrations in the tank. The tank first end wall includes means for receiving the anaerobic treated condensate and the tank second end wall includes means for discharging the treated condensate water to another modular tank. There is a baffle providing for at least two separate compartments in each tank and there is a vertical opening at an opposite end of the baffle in certain of the modular tanks. The vertical opening is substantially the entire height of the baffle. When the reactor is comprised of modular units, it is understood that certain of the units will not include a baffle with a vertical opening thereby allowing the proper plug flow movement of the anaerobic treated condensate throughout the reactor as shown in FIG. 1. The baffle and the vertical opening therein is adapted to provide for continuous plug flow movement of the wastewater through each of the two compartments wherein the plug flow movement of the wastewater comprises a serpentine path for continuous flow of the wastewater through the vertical opening at an opposite ends of the baffle. The plug flow movement comprises a length to width ratio through the reactor tanks of about 8:1 to about 12:1. The two separate compartments have at the bottom of each of the compartments an air diffuser adapted to diffuse nearly pure oxygen and include attached growth media for treating the wastewater constructed and arranged above the air diffusers and substantially filling each of the compartments. There are also scour/sludge removal diffusers for diffusing air for periodic cleaning of the attached growth media and to avoid plugging of the media and also to remove sludge. The wastewater covers the attached growth media, thereby providing for a space between the wastewater and the cover retaining therein the nearly pure oxygen. There is a source of nearly pure oxygen connected to the air diffusers for treating the wastewater. The anaerobic treated condensate enters the tank through the first end wall and flows through the two compartments of the reactor tanks with the continuous plug flow movement and is treated by the attached growth media and the nearly pure oxygen in the fully aerobic system. The higher concentrations of oxygen in the tank provide for a supersaturation of oxygen in the tanks. The treated effluent condensate exits the tank through a means for discharging the treated effluent discharge water in the first end wall when utilizing the modular system. The modular system comprises multiple of the OxyShark® tanks connected together, in one embodiment as shown in FIG. 1, six tanks are used. The treated condensate will have a BOD of less than 500 mg/L and a COD of less than 2,000 mg/L. The treated condensate exits the modular OxyShark® tanks and optionally may be further treated in a clarifier tank and optionally thereafter further treated in an ozone contact tank.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the drawings:

FIG. 4A is a top view of the tank without the cover showing the attached growth media.

FIG. 4B is a top view of the tank without the cover and without the attached growth media showing the scour/sludge diffuser system. FIG. 4C is a partial transparent side view of the tank. FIG. 4D is a partial transparent first end view of the tank. FIG. 4E is a partial transparent second end view of the tank.

FIGS. 5A-5E are views of the scour/diffuser system. FIG. 5A is a perspective view of the system.

FIG. 5B is a top view of the system. FIG. 5C is a side view of the system. FIG. 5D is an enlarged and partial cross-section view of 5D in FIG. 5B. FIG. 5E is a further enlarged view of FIG. 5D. FIG. 5F is an enlarged detailed view of the oxygen diffuser. FIG. 5G is an enlarged detailed view of the scour/sludge removal tube.

DETAILED DESCRIPTION OF THE PREFERRED EMBODIMENTS

Figure 1:
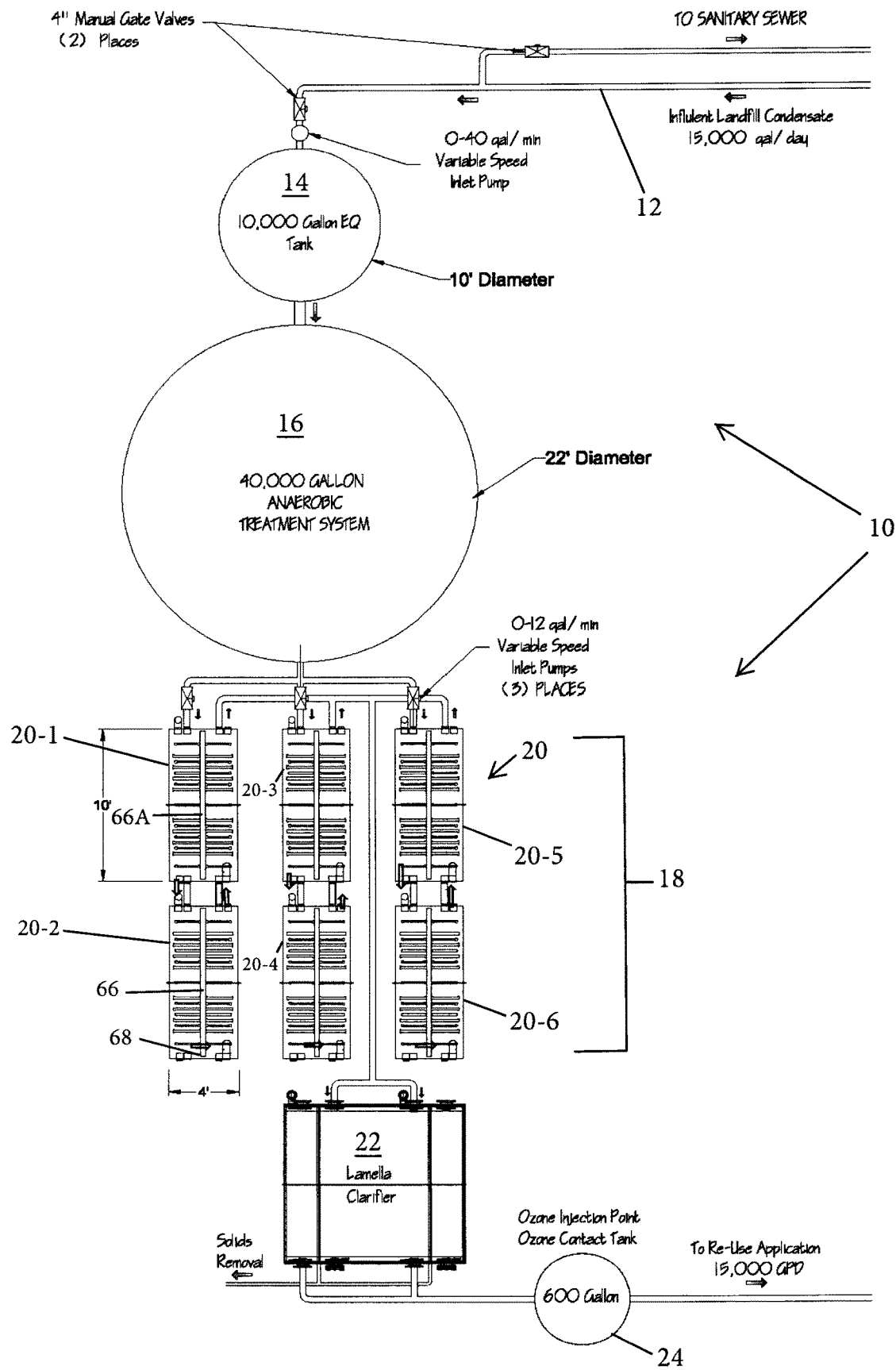
FIG. 1 is a plan view of the apparatus and process of the invention.

The invention is directed to the treatment of landfill wastewater, including landfill condensate, by first using an anaerobic apparatus and process and thereafter treating the pretreated condensate with an aerobic apparatus and process using the OxyShark® system. The system and process of the invention is shown in FIG. 1. Specifically, the system 10 includes an influent condensate line 12; an equalization tank 14 of varying sizes depending on the amount of condensate to be treated; an anaerobic treatment reactor 16 of varying sizes depending on the amount of condensate to be treated; an aerobic treatment reactor 18 comprising a modular system of OxyShark® tanks 20, e.g. six tanks 20-1-20-6; an optional clarifier tank 22 and an optional ozone contact tank 24. These system and process components are discussed in further detail below.

More specifically, the system and process of the invention provides a proven system for removing the organic contaminants from the condensate through anaerobic biological treatment followed by aerobic biological treatment. A typical landfill condensate water can have a BOD approaching 20,000 mg/L and a COD of 35-40,000 mg/L with required post-treatment levels for discharge or reuse of the wastewater being at least less than 500 mg/L and 2,000 mg/L, respectively. The condensate is first passed through an anaerobic process which, through beneficial microbes, degrades the pollutants into less complex organic compounds. The anaerobic process will reduce the influent wastewater pollutants by 70 to 80%, but further degradation to the discharge requirements requires an aerobic treatment process. This combination of treatment processes discussed below using the specific anaerobic and aerobic apparatus and processes has been shown to be an economical and effective way to meet the discharge goals for this type of wastewater, resulting in a significant reduction in pollutant loading to the environment.

Figure 2:
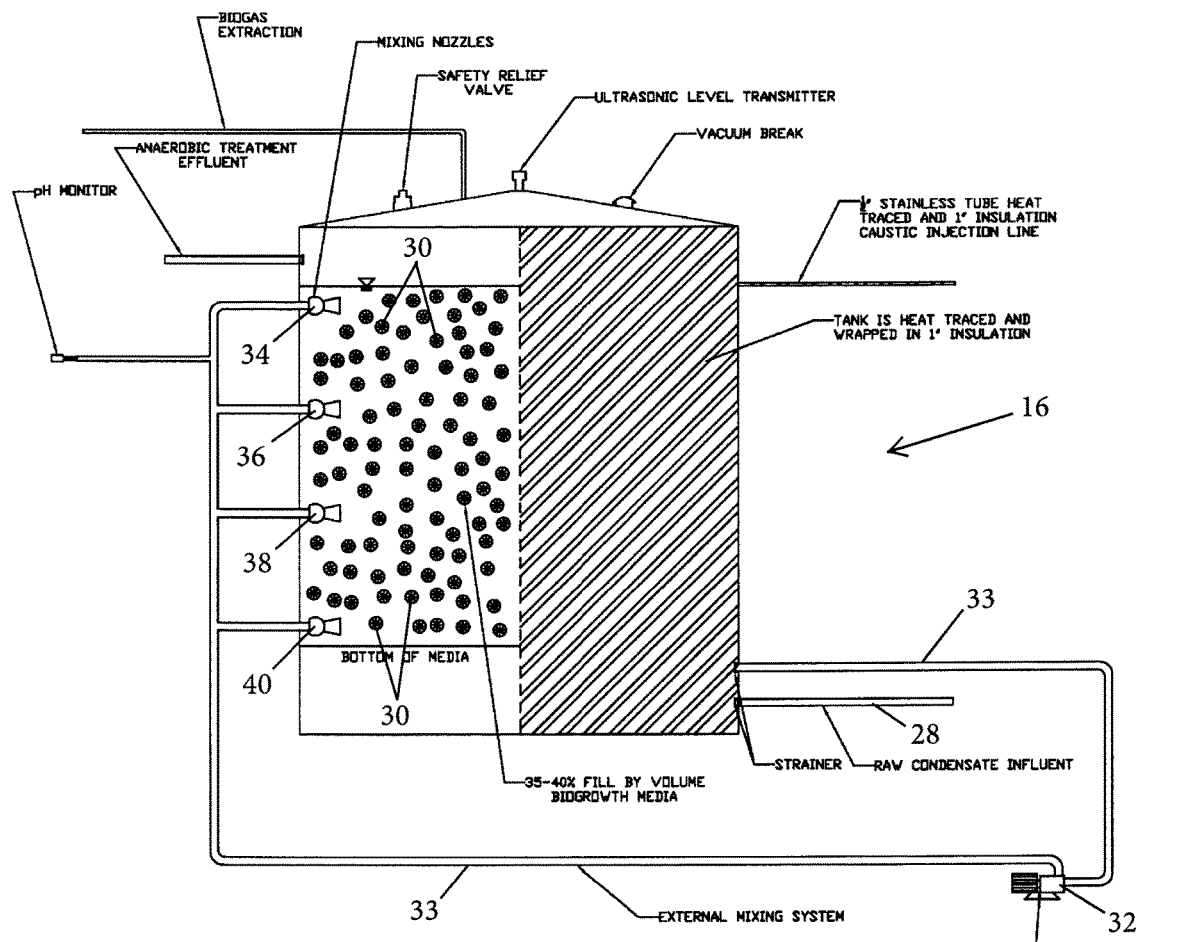
FIG. 2 is a partial cut-away view of the anaerobic treatment system of FIG. 1.

Referring to FIGS. 1 and 2, the process described herein utilizes an attached-growth anaerobic reactor 16 whereby condensate wastewater enters the reactor by piping 28 from an equalization or surge tank 14 and is held in the reactor for a minimum of 60 hours, i.e., the hydraulic retention time (HRT). The anaerobic reactor 16 is filled in the range of 30-50% by volume with media 30 which provides a place for the microbes to attach and grow as they degrade the pollutants of concern. A more preferred range is 35-40% by volume. This media has a surface to volume ratio between 100 to 230 $ft^2/ft^3$ active surface area and comes in small spherical units or other shapes. The media is preferably made of high-density polyethylene (HDPE), PVC or other suitable polymers. HDPE is inexpensive and easy to mold into the complex shapes desired for a high surface to volume ratio. It can be easily "roughened" to create further enhanced bacterial adhesion. Additionally, the shape and density of the media make a slightly buoyant carrier once the biology is fully matured. This feature of the media enhances the anaerobic mixing process. A presently preferred media is BioFas™ B-700 Biomass Carriers made by bioprocessH$_2$O of Portsmouth, R.I.

To further enhance mixing within the anaerobic reactor vessel 16, an external pumping apparatus 32 is used whereby water is drawn off the bottom of the tank 16 through piping 33 and pumped to the near top of the tank in a series of four vertically aligned nozzles 34, 36, 38 and 40 at distances from near the water surface down to near the bottom of the media. The nozzles 34, 36, 38 and 40 have flows of 30%, 25%, 25%, and 20% respectively from the top of the tank to the bottom of the tank, but may vary depending on the wastewater characteristics. This varying flow pattern provides additional mixing efficiency and enhanced performance of the anaerobic process. The piping is preferably PVC although other materials compatible with the reactor water may be used for the piping such as HDPE, fiberglass, or metal.

The reactor 16 is preferably made of made of carbon or stainless steel, or any material used compatible with the water characteristics and pressure within the tank, and is covered by 1 inch of spray foam insulation with a minimum R value of 7. A supplemental heat source may be required to supplement the inherent heat generation of the process to optimize the anaerobic microbe efficiency. The target temperature for an anaerobic process is approximately 35° C., but the process will work at ranges from 25° to 57° C. This can be accomplished with heat tracing tape placed around the tank and under the insulation layer, or any other means to add heat to the anaerobic process. This often depends on geographical location and local meteorological conditions. The tank incudes a pH monitor and the pH is preferably maintained in the range of about 6.6 to 7.6 s.u. After the minimum HRT in the anaerobic reactor is accomplished, the pre-treated condensate is then conveyed to the aerobic treatment process through an additional pump or may flow by gravity depending on site elevations.

Figure 3:
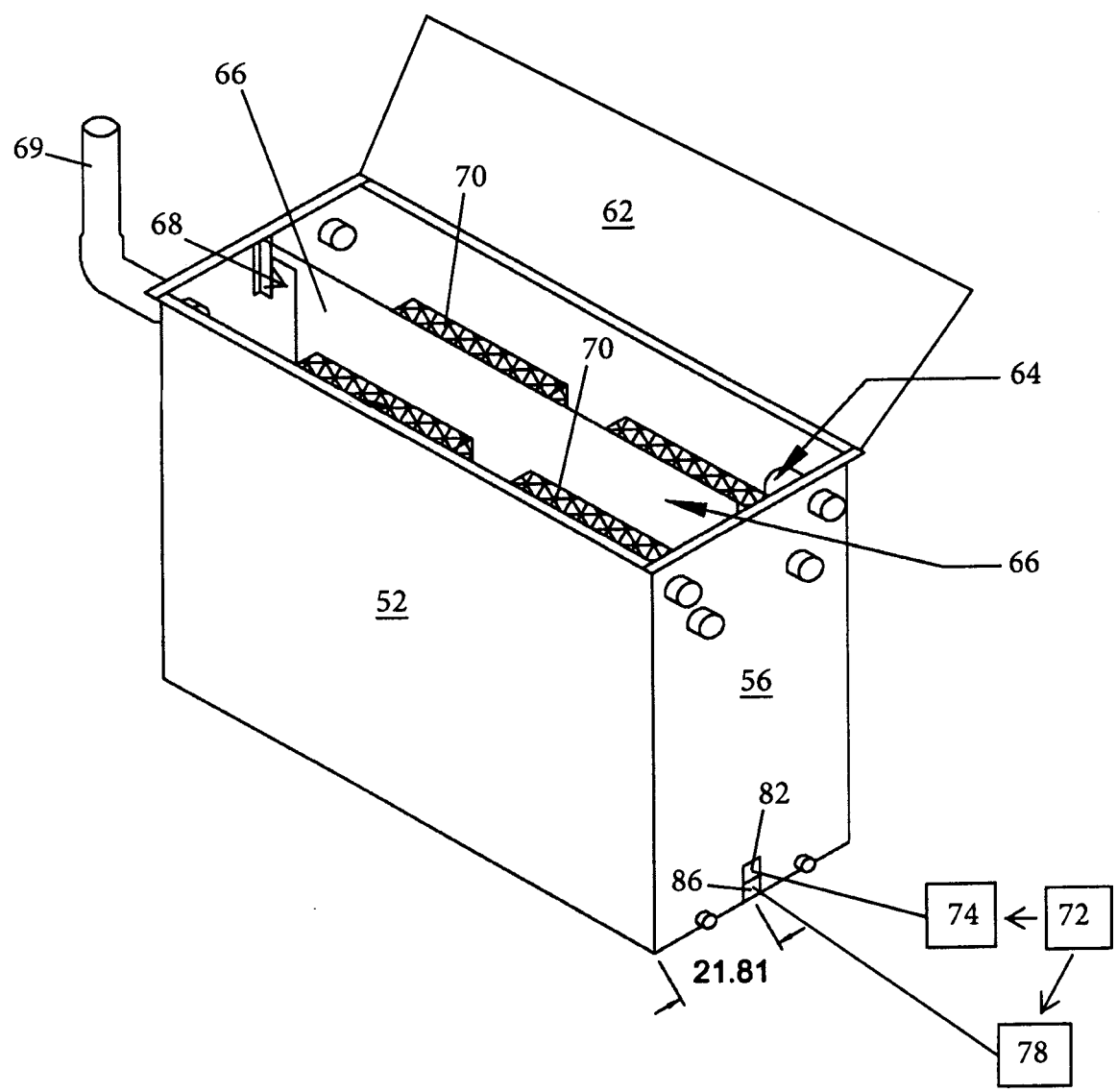
FIG. 3 is a perspective view of one of the OxyShark® aerobic treatment tanks used in a modular system.
Figure 4A:
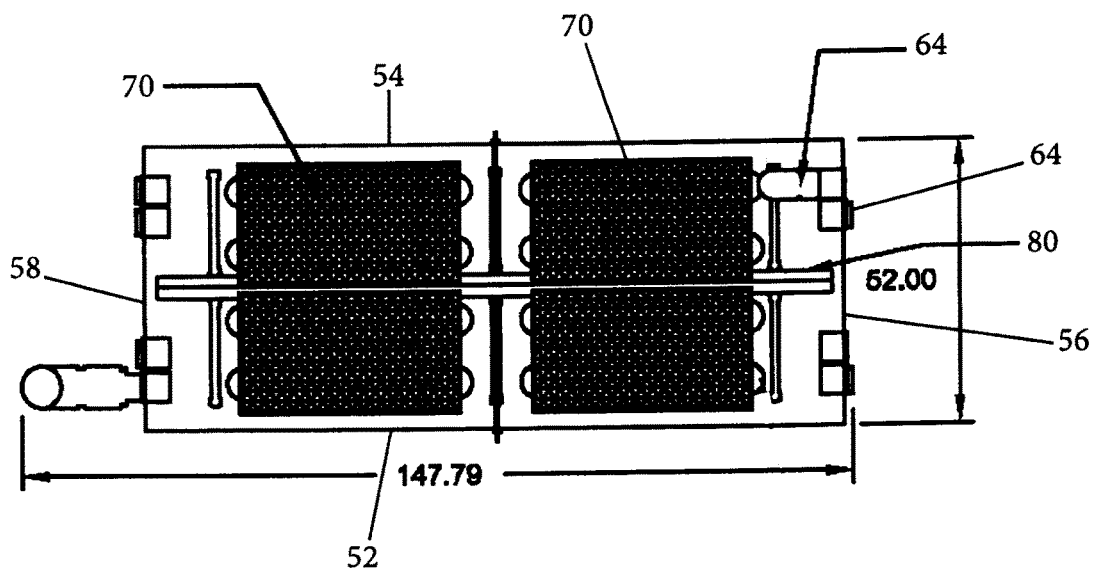
FIGS. 4A-4E are views of the OxyShark® treatment tank of FIG. 3.
Figure 4B:
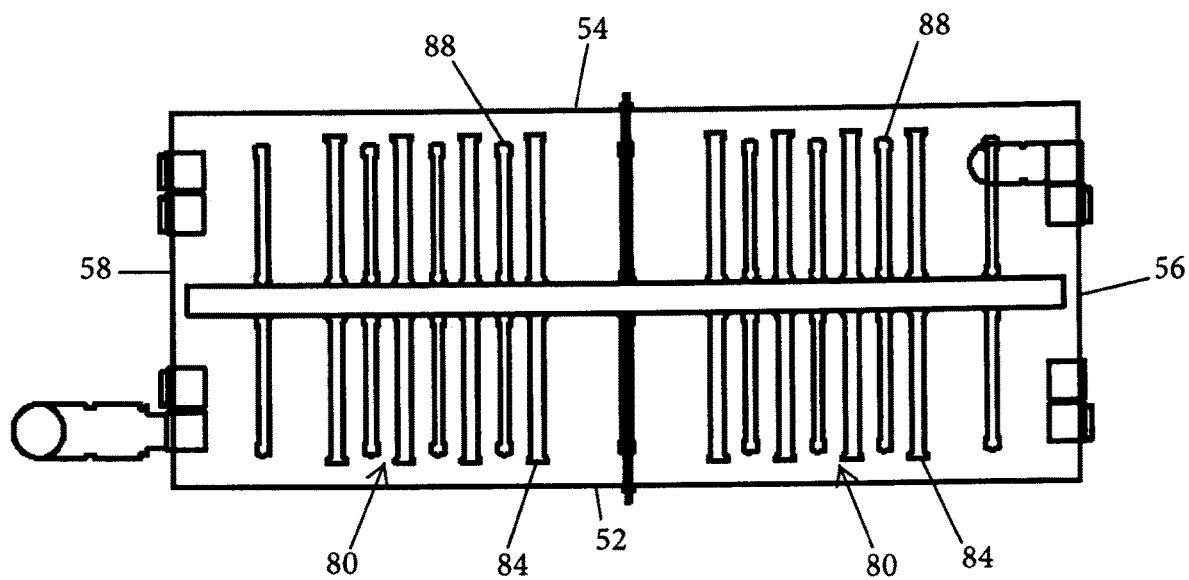
Figure 4C:
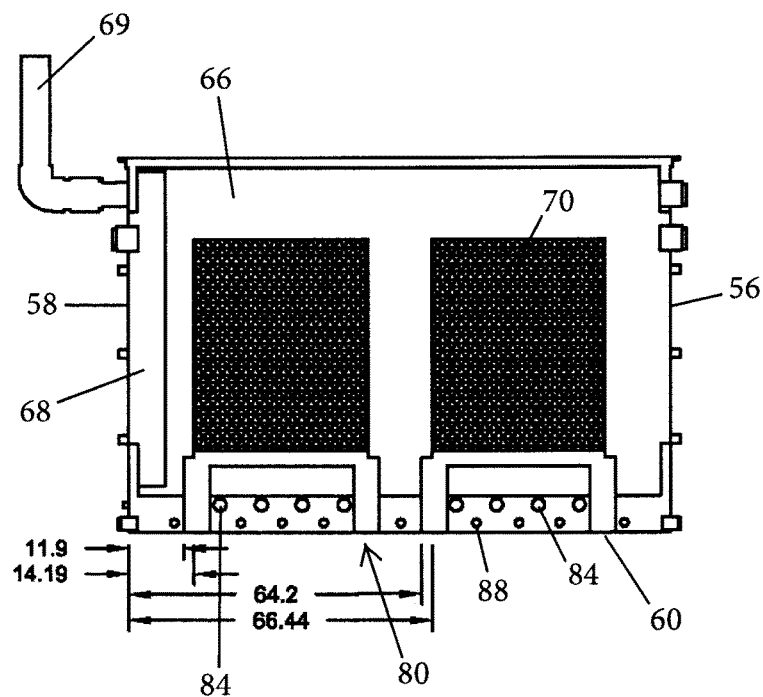
Figure 4D:
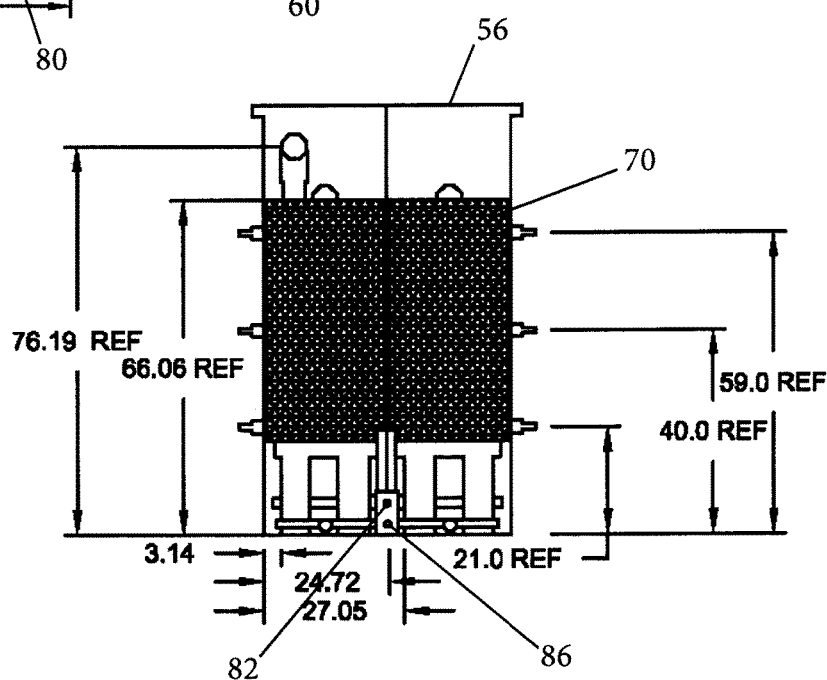
Figure 4E:
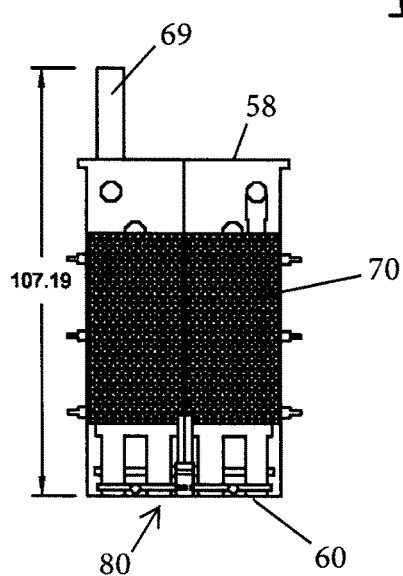

The aerobic process uses the OxyShark® apparatus and process as shown in FIGS. 1, 3, 4 and 5. As seen in FIG. 1, the aerobic process uses a reactor 18 which comprises a modular system of six OxyShark® tanks 20-1-20-6. It is understood that a different number of OxyShark® tanks may be used and a different configuration may be used without departing from the scope of the invention. Referring to FIGS. 3 and 4, the OxyShark® tanks include side walls 52 and 54, end walls 56 and 58, a bottom wall 60 and a top wall 62. The tank walls are preferably made of aluminum. The top wall 62 remains closed in operation and there is a gasket, preferably made of rubber, Viton™ or other suitable material, surrounding the upper ends of the side and end walls to maintain the oxygen in the system. A preferred dimension of the tank is approximately 10 ft. in length, 4 ft. in width and 7 ft. in height, although these dimensions may vary without departing from the scope of the invention. The reactor 18 receives the pre-treated condensate from the anaerobic tank 16 by variable speed inlet pumps at tanks 20-1, 20-3 and 20-5, each tank having an influent opening 64 in end wall 56. The invention uses a plug flow process providing for a continuous path for the movement and treatment of the condensate through each of tanks 20-1 and 20-2, a first "train" of the system; 20-3 and 20-4, a second train of the system; and 20-5 and 20-6, a third train of the system, as shown in FIG. 1 by the arrows. The treated condensate exits from each of tanks 20-1, 20-3 and 20-5 and is then moved from reactor 18 to a further treatment tank or for reuse.

Referring to FIG. 3, the OxyShark® tank includes a baffle 66 which extends vertically from the bottom region of tank 20 and includes a vertical opening 68 in tanks 20-2, 20-4 and 20-6 for the condensate to flow from the first compartment of the modular tanks to the second compartment of the modular tanks. The baffles 66A in tanks 20-1, 20-3 and 20-5 do not include the vertical opening. There is a vent pipe 69 to vent excess gas from the system.

Tank 20 further includes attached growth media bundles 70 for the treatment of the condensate, preferably two bundles 70 in each compartment. A presently preferred growth media is XF68 made by Raschig USA of Arlington, Tex. However, other growth media may be used with the understanding that the proper surface to volume ratio and compatibility with the condensate specifications are met. The growth media will have a minimum surface to volume ratio of about 30 $ft^2/ft^3$ and a maximum surface to volume ration of about 120 $ft^2/ft^3$, a preferred surface to volume ratio of 48-70 $ft^2/ft^3$. The compartment of each tank may include the same surface to volume ratio for the growth media or the surface to volume ratio of the growth media may vary from the minimum surface to volume ratio up to the maximum surface to volume ratio for the different tanks. That is, as the condensate flows through the reactor, the condensate BOD/COD is biologically reduced thereby allowing for a growth media having a higher surface to volume ratio in subsequent tanks. For example, the first compartments of tanks 20-1 and 20-2 may have media having a surface area to volume ratio of 68 $ft^2/ft^3$ and the second compartments of tanks 20-1 and 20-2 may have media having a surface area to volume ratio of 88 $ft^2/ft^3$. Subsequent "trains" in a parallel configuration may be the same or if tanks are arranged in series, growth media may be arranged to allow the surface area to volume ratio to increase after the initial tank(s). For example, in a four—tank scenario in series: tank one may have media with a surface area to volume ratio of 68 $ft^2/ft^3$ in all compartments with tank two having a surface area to volume ratio of 88 $ft^2/ft^3$ in all compartments with tanks three and four having the same surface area to volume ratio as tank two or higher depending on wastewater characteristics.

The OxyShark® process in this application utilizes high purity oxygen, in the range of about 90 to 96% oxygen, preferably 94%. The oxygen is generated using an air compressor 72 that feeds air to an oxygen concentrator 74 to produce the high-purity oxygen for the aerobic OxyShark® process. Air compressor 72 also feeds air to scour air tank 76 as discussed below.

Referring to FIGS. 5A-5G, there is shown an oxygen distribution and scour/sludge removal system 80. The system includes an oxygen header 82 and oxygen diffusers 84 for receiving and diffusing the high purity oxygen into the tank. There is a scour/sludge removal header 86 for receiving compressed air and feeding it to scour/sludge removal tubes 88. In a presently preferred embodiment, there are eight oxygen diffusers in each compartment and above the growth media 70 and nine scour/sludge removal tubes 88. This unique oxygen feed system will provide efficient oxygen feed to the tank with an automatic diffuser cleaning on a programmable schedule, all without exceeding the oxygen generator capacity. All known existing diffuser systems were not suitable for the OxyShark® demanding combination of low diffuser flow and good oxygen distribution. The separate oxygen and scour/sludge headers 82 and 86 improve efficiency by allowing the system to utilize compressed air for scour/sludge removal air rather than the more expensive oxygen. The components of the diffuser system will be discussed in further detail below.

Figure 5A:
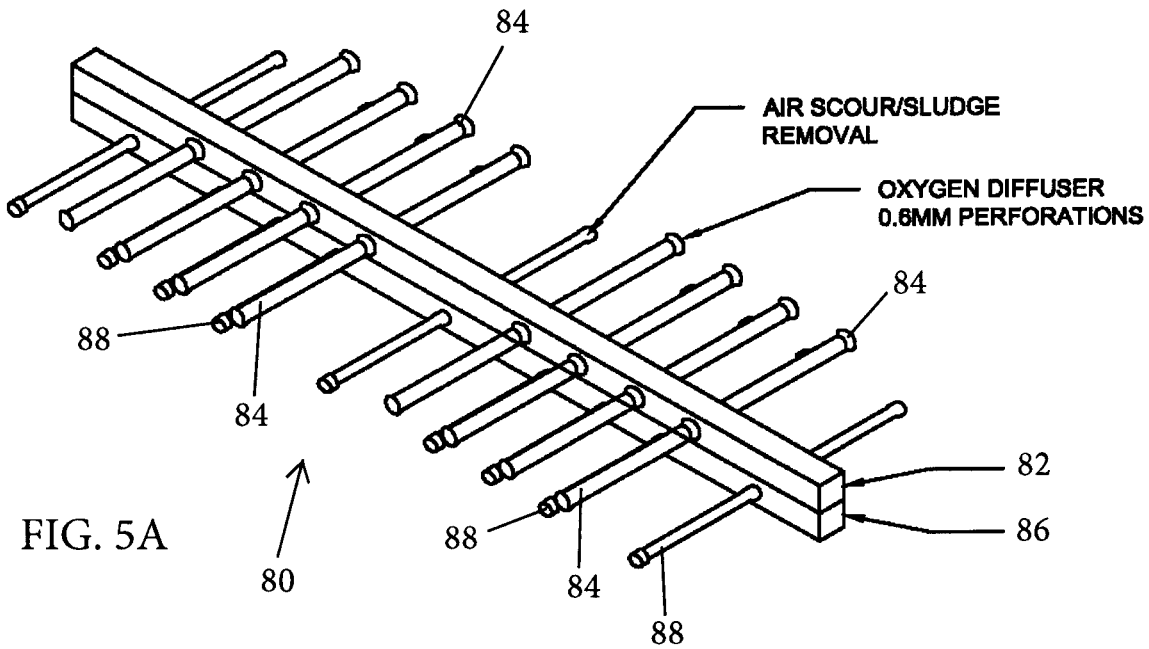
Figure 5B:
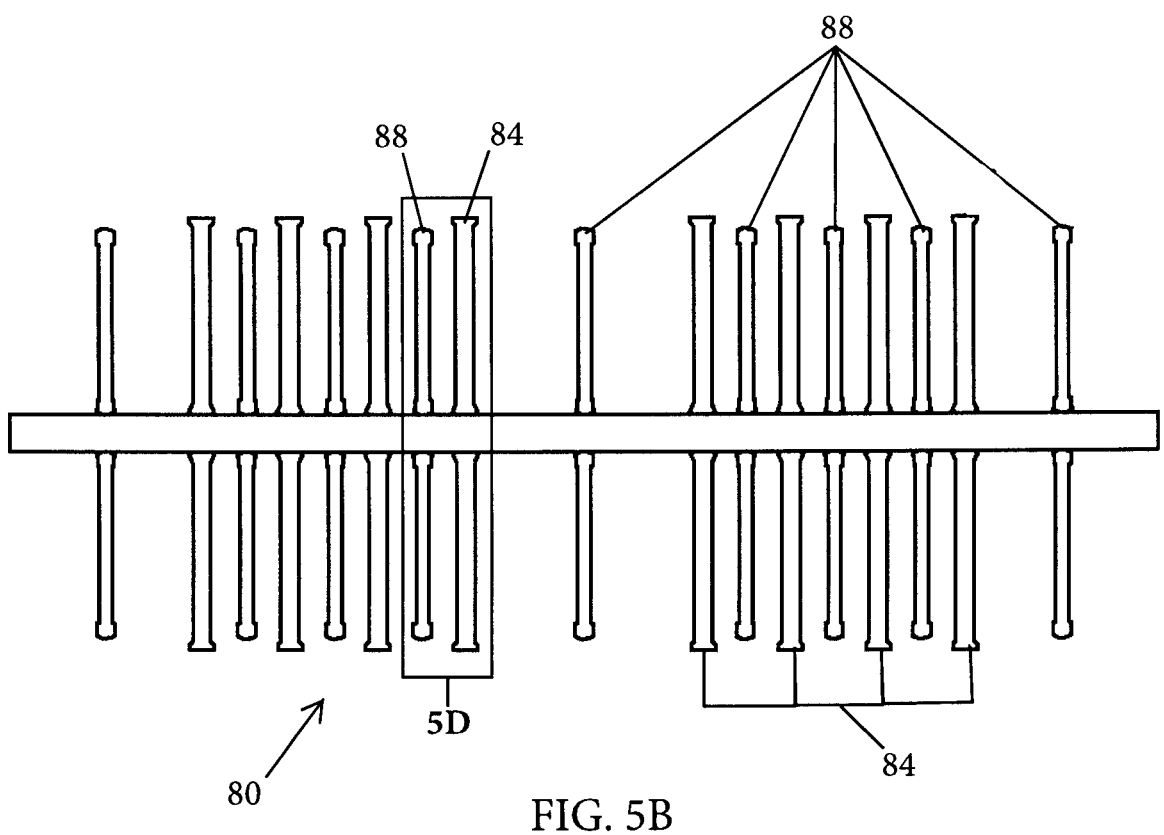
Figure 5C:
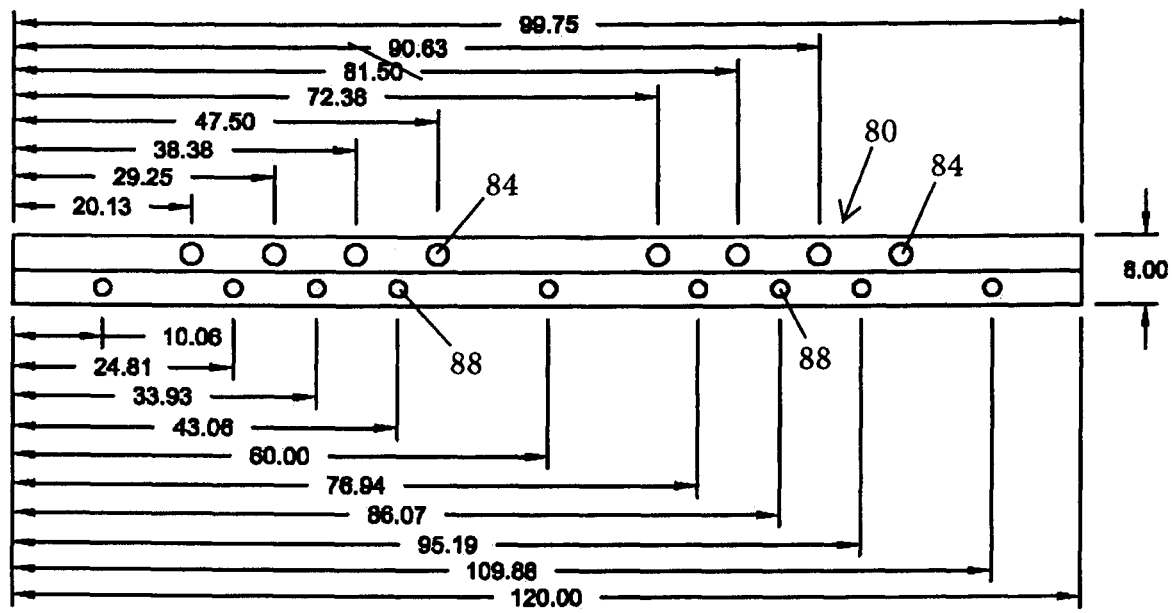
Figure 5D:
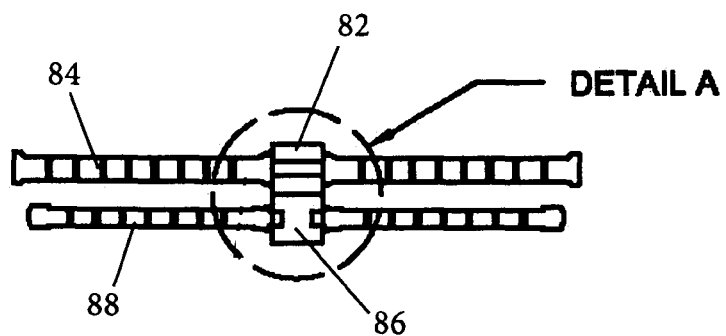

Referring to FIGS. 3 and 5A, the OxyShark® tank includes the oxygen concentrator 74. High purity oxygen is fed to the oxygen header 82 which feeds the oxygen to diffusers 84. Diffusers 84 comprise a tube having 0.6 mm orifice slits as shown in FIG. 5F on the upper half of a rubber membrane 90 and no openings on the bottom half of the tube, the oxygen being provided at 0.25 standard cubic feet per minute (SCFM) per diffuser. The oxygen feed system has two separate oxygen feed rates from one oxygen concentrator controlled by solenoid valves. There is a first oxygen feed rate of lower pressure used in the normal operating condition of the diffusers, and there is a second higher pressure rate used when diffuser cleaning is required, the higher pressure solenoid valve opens and allows the additional oxygen to "inflate" the flexible diffuser membrane and sloth off any excess accumulated biological growth. The diffuser cleaning occurs according to a programmable schedule and is designed to reduce the oxygen demand by controlling how many diffusers are cleaned at one time. The system may reduce the oxygen demand for a cleaning by about 77%.

The amount of oxygen diffused in each tank is calculated based on the BOD and COD of the condensate. As the condensate flows through the reactor 18 and the pollutants removed, the oxygen required may be decreased, thereby allowing for the use of less oxygen in subsequent tanks.

The scour/sludge header 86 receives compressed air from compressed air source 72, and there is a scour air "wet" tank 76 for storing scour air. In a preferred embodiment, compressed air is used. However, a combination of compressed air and high purity oxygen or high purity oxygen may be used without departing from the scope of the invention. Header 84 feeds the scour/sludge removal tubes 88 with the compressed air at programmed intervals, e.g. two times per week, the intervals being dependent on monitoring the biology and chemistry of the system and the need for cleaning. Referring to FIG. 5G, there is shown an enlarged view of a portion of the scour/sludge removal tube 88. The tube is preferably made of 1 inch PVC and includes 0.6 mm slits on the upper half 92 of the tube only. The system uses scour air solenoids which allow a minimum size compressor by scouring the OxyShark® attached growth media in sections rather than all at once as is done in traditional wastewater treatment plant designs. The scour air is provided at 3-5 SCFM per square foot of attached media for ten to fifteen minutes per OxyShark® module. Without the combination of scour solenoids and scour air tank, the required compressor would be an estimated three to four times larger than the present system's requirements and no extra blower is required. The scour air header serves a secondary purpose of providing a place to extract biological solids should they build up in the OxyShark® process tank. As is the case with biological wastewater treatment processes, some of the biomass may settle, i.e., sludge, to the bottom of a treatment tank and need to be removed occasionally. This process can be easily accomplished without removing the media or water from the tank(s) by attaching a suction pump to the air scour/sludge removal header with a connection external to the tank. The suction pump can then be turned on to remove any settled solids, i.e., biomass debris, sludge, etc., from the tank and disposed of with the overall plant solids disposal protocol. After suction of the solids is accomplished, the pump can be removed and used on other tanks as necessary.

The wastewater entering the OxyShark® system from the anaerobic reactor remains in the reactor for a minimum HRT of 60 hours. This HRT may vary depending on the strength of the influent water, discharge requirements or other process control needs. After the required HRT within the OxyShark® system, the water flows to a storage area or a further tank for additional treatment. In a preferred embodiment, a Lamella style clarifier 22 is used, such as sold by Parkson Corporation of Fort Lauderdale, Fla., whereby solids-liquids separation is achieved. The solids, i.e., microbial debris from OxyShark®, are collected in a container for disposal, composting or any other beneficial use. The clarified water may be further treated with additional processes for the purpose of disinfection, further oxidation of any remaining contaminants, or odor control. A presently preferred process is ozone contact tank 24. Other processes such as granular activated carbon may be used to capture organic contaminants; ion exchange for removal of undesirable anions or cations; post-chlorination for disinfection; filtration for additional solids removal, or other processes depending on discharge requirements.

In developing the claimed invention, the applicant McFadden Engineering began treatment of the landfill wastewater condensate with the OxyShark® system. While the OxyShark® system proved useful, it was discovered that the OxyShark® system, including with improvements defined herein, worked surprisingly better when using an anaerobic pretreatment system as set forth in this patent application. The following is a case study of the development of the system and process of the invention undertaken at the EDL facility in Brea, Calif. (Brea Power). This will further explain the invention.

The Brea Power facility is a renewable energy company that operates electricity production facilities that convert landfill gas into renewable electricity. This process generates a condensate stream with a fraction of leachate which is high in biodegradable material and requires treatment before being discharged to the environment. The Brea Power facility is in need of a biological wastewater treatment system (WWTS) for treating the condensate stream.

Environmental Business Specialists, LLC (EBS) performed a treatability study using a pilot OxyShark® unit designed by McFadden Engineering, Inc. of Mobile, Ala. to determine the sizing requirements for a full-scale WWTS. An OxyShark® unit is a fixed-film WWTS that contains high-surface-area media for beneficial bacteria to grow on, as well as a high concentration of dissolved oxygen (DO), i.e. about 90 to 94%, due to an oxygen concentrator. The goal of treatment is to produce a final effluent that may be used in cooling towers at the Brea Power facility, which requires a target total biochemical oxygen demand (tBOD) of 1,000 mg/L or less or other approved applications, such as dust control, landscape irrigation, pre-treatment for sewer discharge, or any other approved and permitted application. It has been determined that anaerobic pretreatment is useful to treat the condensate stream to an acceptable level while minimizing the size and aeration requirements, i.e. compressor and oxygen concentrator size, for the OxyShark® unit. Therefore, an anaerobic reactor, which breaks down wastewater into easily biodegradable organic acids, methane, and carbon dioxide and is ideal for treating high strength wastewater, has been operated in conjunction with an OxyShark® unit to assist in treatment.

The OxyShark® pilot unit in combination with an anaerobic reactor pilot unit has been successful in reducing the tBOD (total BOD) to well below the target of 1,000 ppm. The average BOD percent removal of the combination anaerobic reactor and OxyShark® unit was 98.3%. Once the final effluent is diluted in water to 10% or more of total volume the apparatus and method of the invention will meet the criteria for use as a reclaimed water in cooling towers.

The initial ammonia concentration in the Brea Power influent was insufficient to meet BOD:N requirements for anaerobic and aerobic processes, and ammonia was added to improve treatment. During the testing phase, the anaerobic reactor consumed an average of 15.97 mg/L of ammonia, and the OxyShark® unit consumed an average of 616.58 mg/L of ammonia. To reuse the effluent in cooling towers, it must have a concentration of less than 20 mg/L, so excess ammonia beyond what the WWTS will consume should not be added. The initial ortho-phosphorus concentration in the influent was also insufficient to meet BOD:P requirements for aerobic processes. Ortho-phosphorus or other phosphorus may be added as needed to enhance the process.

Influent and effluent were tested for volatile organic compounds (VOCs) and semi-volatile organic compounds (SVOCs). Acetone, 2-butanone (MEK), acenaphthene, dibenzofuran, bis (2-ethylhexyl) phthalate, 2-methylnaphthalene, and naphthalene were detected. The OxyShark® unit effluent was tested for phenols, and none were detected.

Ozone testing was conducted to determine the effect of ozonation on the total heterotrophic bacteria concentration and the fecal coliform concentration in the OxyShark® unit effluent. Ozonation reduced the MPN (most probable number) of culturable bacteria by 98.7%. The fecal coliform concentration was below the detection limit of 10 MPN/100 mL in both the raw OxyShark® unit effluent and the ozonated OxyShark® unit effluent.

The entire system consisted of an up-flow anaerobic reactor and an aerobic OxyShark® unit. The Brea Power wastewater flowed through the unit according to the flow diagram shown in FIG. 6 and illustrating the anaerobic reactor and the OxyShark® unit of the pilot study. As set forth above, the commercial apparatus and process is further shown in the attached FIG. 1.

Figure 6:
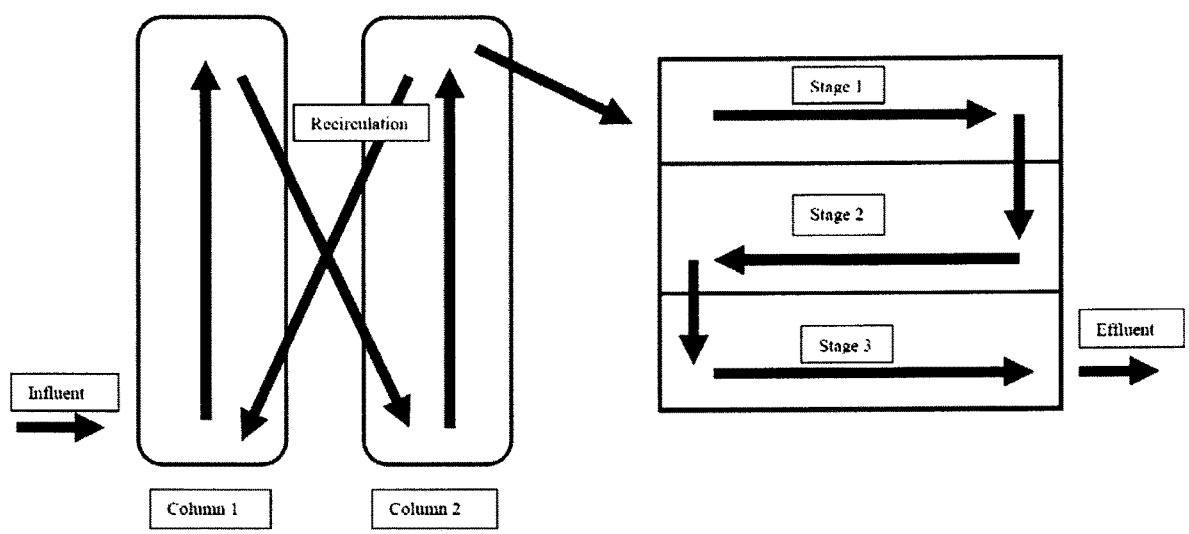
FIG. 6 is a flow diagram of the pilot plant used in developing the invention.

The anaerobic reactor contains anaerobic bacteria, which break down complex organic compounds into simple organic acids, as well as methane and carbon dioxide. Referring again to the pilot study, the up-flow anaerobic reactor as shown in FIG. 6 consisted of two columns filled with high-surface-area media for anaerobic bacteria to grow on. The Brea Power condensate was pumped through the bottom of each column to allow for control of the rate of flow. A recirculation line connected the columns to keep the columns well mixed while promoting methanogen growth. The recirculated water was pumped at a rate of 60 mL/min. A heater on the recirculation line heated the water to 30° C., and the columns were lined with fiberglass insulation to conserve heat. An in-line pH control system prevented the pH from dropping below 7 during the anaerobic process by injecting sodium carbonate into the recirculation line as needed. Sodium carbonate was also added to the influent at a concentration of 4.377 g/L, in addition to ammonium chloride, which was added at a concentration of 0.661 g/L, and micronutrients, which were added to promote bacterial growth. The HRT of the anaerobic reactor was 60 hours. The anaerobic reactor was installed to the unit on Mar. 14, 2019 after an acclimation phase.

An OxyShark® unit is a fixed-film WWTS that contains high-surface-area media for beneficial bacteria to grow on. Referring to FIG. 6, the OxyShark® unit portion of the pilot unit consisted of three aerated stages, each containing the high surface area media for biofilm formation, and oxygen was supplied using an oxygen concentrator. Ammonia and orthophosphate, as a source of nitrogen and phosphate, as nutrients crucial for bacterial growth, were supplied directly to the OxyShark® unit through a peristaltic pump in the form of a 10% nutrient blend containing 20% ammonia and 10% orthophosphate. Starting on May 2, 2019, the pH was controlled inside the OxyShark® unit using a pH control system that added sulfuric acid as needed to keep the pH below 8.5. Prior to this, the pH in the reactor was manually adjusted using sulfuric acid or sodium carbonate, depending on need. The HRT of the OxyShark® unit was 60 hours. The OxyShark® unit was installed on Nov. 29, 2018, and after an acclimation phase, the testing phase began on Dec. 26, 2018.

Brea Power wastewater arrived at EBS in 350-gallon totes at 2 points in the study: the first batch arrived on Nov. 7, 2018, and the second batch arrived on Mar. 22, 2019. The totes were kept in the EBS warehouse.

On Nov. 29, 2018, the OxyShark® unit was seeded with biomass from three local refineries and chemical companies so that the TSS concentration inside of the OxyShark® unit was 3,000 mg/L. The target starting food to mass (F:M) ratio, which is a measure of the concentration of waste compared to the concentration of bacteria, was 0.2, which was achieved by adding 489 mL of Brea Power condensate to the reactor. The condensate was pH-adjusted and enriched with ammonium and orthophosphate prior to being added. On Dec. 5, 2018, the F:M ratio was increased to 0.6 by adding MicroCarb, an EBS glycerin based wastewater treatment supplement, to provide an easily biodegradable substrate. This was to allow the bacteria to acclimate to the high BOD of the condensate. The concentration of condensate was progressively increased when the effluent COD stabilized, indicating that the biomass had acclimated to that concentration of condensate. The HRT was also progressively reduced based on effluent COD stabilization. On Dec.

12, 2018, the HRT was reduced from 12 days to 6 days, on Dec. 14, 2018, the HRT was reduced to 4 days, and on Dec. 20, 2018, the HRT was reduced to 2 days. During the acclimation phase, the influent and effluent pH, DO, temperature, oxidation-reduction potential (ORP), the total and soluble COD (tCOD/sCOD), ammonia as nitrogen ($NH_3$-N), and orthophosphate as phosphorous ($PO_4$-P) were monitored. The analytical testing schedule during the acclimation phase is provided in Table 1.

TABLE 1

Acclimation Phase Analytical Testing Schedule-OxyShark® unit:

| Parameter | Influent | OxyShark |
| --- | --- | --- |
| pH | 1x/week | 5x/week |
| DO | 1x/week | 5x/week |
| Temp | 1x/week | 5x/week |
| ORP | 1x/week | 5x/week |
| tCOD | 1x/week | 5x/week |
| sCOD | 1x/week | 5x/week |
| NH3-N | 1x/week | 5x/week |
| PO4-P | 1x/week | 5x/week |

The testing phase began on Dec. 26, 2018. pH, DO, temperature, ORP, TSS, volatile suspended solids (VSS), total and soluble biochemical oxygen demand (tBOD/sBOD), tCOD, sCOD, $NH_3$-N, and $PO_4$-P were monitored. The analytical schedule for the OxyShark® unit testing phase is provided in Table 2 as follows:

TABLE 2

Testing Phase Analytical Testing Schedule-OxyShark® unit:

| Parameter | Influent | Aeration Basins | OxyShark |
| --- | --- | --- | --- |
| pH | 1x/week | 3x/week | 5x/week |
| DO | 1x/week | 3x/week | 5x/week |
| Temp | 1x/week | 3x/week | 5x/week |
| ORP | 1x/week | 3x/week | 5x/week |
| TSS | 1x/week | | 3x/week |
| VSS | 1x/week | | 3x/week |
| tBOD | 1x/week | | 3x/week |
| sBOD | 1x/week | | 3x/week |
| tCOD | 1x/week | 2x/week | 5x/week |
| sCOD | 1x/week | 2x/week | 5x/week |
| NH3-N | 1x/week | 1x/week | 5x/week |
| PO4-P | 1x/week | 1x/week | 5x/week |

On Dec. 25, 2019, the HRT was lowered to 60 hours. On Feb. 11, 2010, ammonium and phosphate in the form of 2010 nutrient blend, which contains 20% ammonium and 10% phosphate, were added to optimize treatment. The testing phase ended on May 23, 2019.

The anaerobic reactor was installed on Feb. 22, 2019. The columns were packed with approximately half of the media from the OxyShark® unit, which was covered in acclimated biomass, along with new media. The columns were also seeded with granular anaerobic sludge, which was confirmed to produce gas in anaerobic conditions by a respirometry study. Influent was added so that the COD in the columns was approximately 5 g/L. The media removed from the OxyShark® unit was replaced with new media during this time. Initially, the anaerobic reactor was not connected to the OxyShark® unit, and Brea Power influent was recycled through the columns at a rate of 60 mL/min to keep the columns well mixed while promoting methanogen growth. The influent was replaced approximately every other day. On Mar. 14, 2019, the anaerobic reactor was connected to the OxyShark® unit for continuous flow operation. Both the anaerobic reactor and the OxyShark® unit had an HRT of 60 hours. Artificial influent was made with sodium acetate, which is easier to degrade than Brea Power influent. On Mar. 15, 2019, the anaerobic reactor was seeded with anaerobic sludge from a local plant. On Mar. 22, 2019, anaerobic influent was made by diluting the Brea Power influent with deionized water, at a ratio of 1.46 L of influent per 7.2 L of water. On Apr. 2, 2019, the concentration of Brea Power influent was increased to 25%. On Apr. 3, 2019, the concentration of Brea Power influent was increased to 50%. On Apr. 23, 2019, the concentration of Brea Power influent was increased to 75%. On Apr. 29, 2019, the concentration of Brea Power influent was increased to 100%, ending the acclimation phase. Throughout both the acclimation phase and the testing phase, the pH of the reactor was adjusted as needed and alkalinity was optimized to stabilize the pH so that period pH adjustments could be discontinued. Ultimately, 4.377 g/L of sodium carbonate was added to the influent, and supplemental sodium carbonate was added directly to the columns as needed via a pH controller to maintain the digester pH at 7.0. During both the acclimation and the testing phase, the pH, tBOD, sBOD, tCOD, sCOD, alkalinity, and volatile fatty acids (VFAs) were monitored. Sampling occurred from the recirculation line. The analytical testing schedule is provided in Table 3.

TABLE 3

Analytical Testing Schedule-Anaerobic Reactor:

| Parameter | Anaerobic Columns |
| --- | --- |
| pH | 5x/week |
| tBOD | 3x/week |
| sBOD | 3x/week |
| tCOD | 3x/week |
| sCOD | 3x/week |
| Alkalinity | 5x/week |
| VFA | 5x/week |

On Mar. 26, 2019, EBS sent a sample of influent to Pace Analytical, an independent lab, to perform volatile organic compound (VOC) and semi volatile organic compound (SVOC) testing, as requested by Brea Power. Testing was performed on Mar. 26, 2019 using EPA methods 8270 and 8260.

On May 14, 2019, EBS sent a sample of OxyShark® unit effluent to Pace Analytical to perform phenol testing, as requested by Brea Power. The sample was a composite collected between May 13, 2019 and May 14, 2019 and was preserved in a glass bottle using sulfuric acid. Testing was performed on May 16, 2019 using EPA method 420.4.

On May 31, 2019, EBS ran fecal coliform and ozonation testing, to determine if the OxyShark® unit effluent would contain fecal coliforms, and what affect post-treatment ozonation would have on the bacterial population in the OxyShark® unit effluent. Initial heterotrophic plate counts and fecal coliforms were run on a composite of raw OxyShark® unit effluent, collected between May 30, 2019 and May 31, 2019. 100 mL of the raw OxyShark® unit effluent was then ozonated for 30 minutes in a flask, and final heterotrophic plate counts and fecal coliform testing was run.

Initial physicochemical testing was performed on both batches of Brea Power wastewater, shown in Table 4. Both batches had similar characteristics.

TABLE 4

Initial Physicochemical Influent Testing:

| Parameter | Nov. 7, 2018 | Mar. 22, 2019 |
|---|---|---|
| pH | 4.63 | 4.26 |
| (mg/L) | 96.5 | 82.5 |
| TKN (mg/L) | 147.2 | |
| PO4-P (mg/L) | 0.05 | 0.36 |
| TSS (mg/L) | 28 | 19 |
| VSS (mg/L) | 23 | 19 |
| tCOD (mg/L) | 31200 | 33680 |
| sCOD (mg/L) | 30920 | 32300 |
| tBOD (mg/L) | 26860 | 19736 |
| sBOD (mg/L) | 15495 | 18124 |
| Alkalinity (mg/L) | 137 | 200.5 |

The influent characteristics were monitored weekly to determine stability. The first batch of influent showed a percent difference of less than 1% between the initial sBOD testing and the final sBOD and the second batch of influent showed a percent difference of less than 5%. This indicates that the influent was stable and not much degradation occurred during storage over the length of the study.

Figure 7:
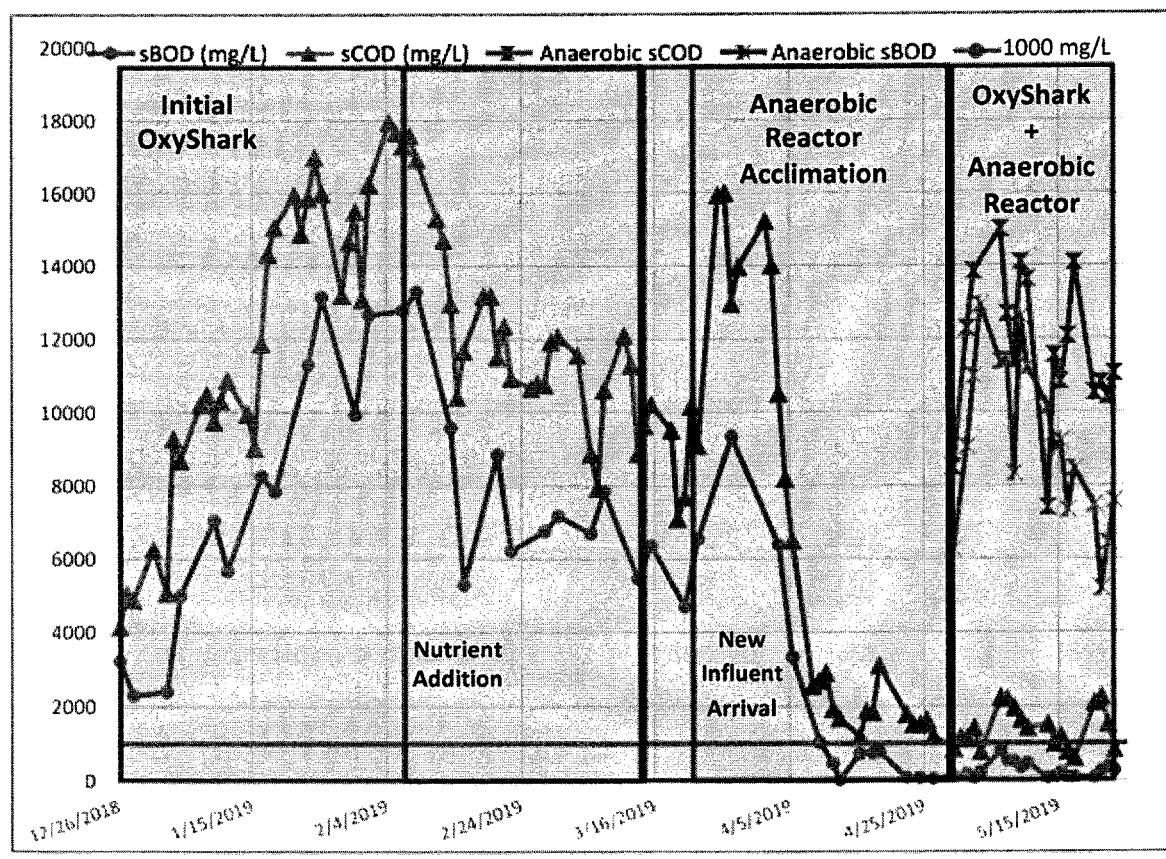
FIG. 7 is a chart showing test results from the pilot plant used in developing the invention.

The effluent and anaerobic sBOD and sCOD are provided in FIG. 7. Before the installation of the anaerobic reactor, the sBOD was well above the target of 1,000 mg/L. The average sBOD during this time was 7,762 mg/L. On Feb. 11, 2019, due to the increasing sBOD and sCOD, nutrients were added in the form of a nutrient blend containing 20% ammonia and 10% orthophosphate. This improved treatment but did not bring the sBOD to the target concentration of 1,000 mg/L, so it was determined that the anaerobic reactor would be added. On Mar. 22, 2019, new influent arrived from Brea Power, which had a 15.6% higher sBOD than the previous influent, leading to a spike in effluent BOD and COD. During the anaerobic reactor acclimation phase, the sBOD and sCOD dropped sharply, and during the testing phase of the anaerobic reactor, the average sBOD was 251 mg/L, well below the target. The average sBOD of the Brea Power influent was 15,138 mg/L, and the average sBOD of the anaerobic reactor effluent was 9,156 mg/L. This indicates that anaerobic reactor and the OxyShark® unit each contributed similarly to the total sBOD removal. During this time, the percent removal of the combined anaerobic reactor and OxyShark® unit was 98.3%.

Nutrients, including ammonia, were required to achieve efficient treatment. During the study, supplemental ammonia was added to achieve a concentration equal to 150:1 COD:N in the anaerobic reactor, and 100:5 BOD:N in the OxyShark® unit, which is recommended in the literature. This was equal to an ammonia concentration of 255.5 mg/L in the anaerobic reactor influent feed, and a concentration of 960.71 mg/L in the OxyShark® unit feed. A mass balance showing the average ammonia used in the pilot unit over the anaerobic/OxyShark® unit testing period (Apr. 29, 2019-May 23, 2019) is provided in Table 5. The average ammonia consumption measured over the study was 15.97 mg/L in the anaerobic reactor and 616.58 mg/L in the OxyShark® unit. This gives an estimate of the amount of ammonia that will be needed by the Brea Power WWTS during operation.

TABLE 5

Ammonia Mass Balance:

| Parameter | Entering Unit (mg/L) | Exiting Unit (mg/L) | Consumed (mg/L) |
|---|---|---|---|
| Initial Influent NH3-N | 82.50 | | |
| Additional Influent NH3-N | 173.0 | | |
| Total NH3-N Entering Anaerobic Reactor (Theoretical) | 255.50 | | |
| Total NH3-N Entering Anaerobic Reactor (Measured) | 229.18 | | |
| NH3-N Exiting Anaerobic Reactor | | 213.21 | |
| NH3-N Used by Anaerobic Reactor | | | 15.97 |
| Additional NH3-N Entering OxyShark | 747.50 | | |
| Total NH3-N Entering OxyShark | 960.71 | | |
| NH3-N Exiting OxyShark | | 344.13 | |
| NH3-N Used by OxyShark | | | 616.58 |

VOC/SVOC testing performed on Brea Power influent detected acetone, 2-butanone (MEK), acenaphthene, dibenzofuran, bis (2-ethylhexyl) phthalate, 2-methylnaphthalene, and naphthalene. The data is provided in Table 6. The influent sample was collected on Mar. 26, 2019 and the effluent sample tested was collected on Mar. 1, 2019.

TABLE 6

VOCs/SVOCs:

| Compound | Influent Concentration (ug/L) | Effluent Concentration (u/L) |
|---|---|---|
| Acetone | 57000 | ND |
| 2-Butanone (MEK) | | ND |
| Acenaphthene | 104 | ND |
| Dibenzofuran | 53.0 | ND |
| Bis(2-Ethylhexyl)phthalate | 129 | ND |
| 2-Methylnaphthalene | 112 | ND |
| Naphthalene | 118 | ND |
| Phenol | ND | 172 |

Phenol testing performed on OxyShark® unit effluent collected from May 13, 2019 to May 14, 2019 showed less than the reporting limit of 0.020 mg/L.

Fecal coliform/ozonation data collected on May 31, 2019 is provided in Table 7. This testing was performed to determine if ozone post-treatment would remove any fecal coliforms found in the effluent. Plate count testing was also performed on the raw and ozonated sample, which measures the number of total culturable bacteria, or colony-forming units (cfu). The ozone treatment reduced the culturable bacteria by 98.7%. The ozone also reduced the COD by 29.9%. Neither the raw influent nor the ozone-treated effluent had any detectable fecal coliforms.

TABLE 7

Fecal Coliform/Ozonation:

| Compound | COD (mg/L) | Culturable Bacteria (cfu/mL) | Fecal Coliforms (MPN/100 mL) |
|---|---|---|---|
| Raw Effluent | 1020 | 1.89E+07 | <10 |
| Ozone-Treated Effluent | 715 | 2.40E+05 | <10 |

In conclusion, Brea Power contracted EBS to run a pilot unit study to determine the sizing requirements for an OxyShark® wastewater treatment system, designed by McFadden Engineering, to treat their landfill condensate wastewater. The initial goal was to treat Brea Power's effluent using an OxyShark® unit alone; however, it was determined that an anaerobic reactor in conjunction with the OxyShark® unit would lower sizing and aeration costs for treating Brea Power's high-strength wastewater. The OxyShark® unit in combination with the anaerobic reactor pilot unit was successful in reducing the tBOD to well below the target of 1,000 ppm. The average percent removal of the combination anaerobic reactor and OxyShark® unit was 98.3%. Once the final effluent is diluted in water to 10% as previously planned, it will meet the criteria for reuse in cooling towers. During the testing phase, the anaerobic reactor consumed an average of 15.97 mg/L of ammonia, and the OxyShark® unit consumed an average of 616.58 mg/L of ammonia. Feeding the correct amount of ammonia to the Brea Power WWTS will be important to achieve maximum efficiency treatment, while keeping the effluent ammonia residual below the target of 20 mg/L. The Brea Power effluent was tested for volatile organic compounds (VOCs) and semi volatile organic compounds (SVOCs). Acetone, 2-butanone (MEK), acenaphthene, dibenzofuran, bis (2-ethylhexyl) phthalate, 2-methylnaphthalene, and naphthalene were detected. The OxyShark® unit effluent was tested for phenols, and none were detected. Ozone testing was conducted to determine the effect of ozonation on the concentration of both culturable bacteria and fecal coliforms in the OxyShark® unit effluent. Ozonation reduced the MPN (most probable number) of culturable bacteria by 98.7%. The fecal coliform concentration was below the detection limit of 10 MPN/100 mL in both the raw OxyShark® unit effluent and the ozonated OxyShark® unit effluent. Based on the Brea Power study, it has been concluded that the commercial apparatus and process shown in FIGS. 1-5 will effectively treat the wastewater condensate at the Brea Power facility.

The components of the apparatus and process of the invention include those referred to in FIGS. 1-5 and as set forth hereafter.

Anaerobic Pre-Treatment. (1) Anaerobic pre-treatment system including one 50,710 US gallon carbon steel tank of rolled tapered panel bolted design. The nominal inside diameter is 20.80 feet. The nominal eave height is 20.95 feet. The bottom style is embedded base setting ring installed and sealed by purchaser's contractor. The tank is supported by a reinforced concrete foundation meeting the requirements of AWWA D103-09. The roof style is a steel cone with 2" rise to 12" run (9.46-degree slope). The interior coating is light gray LIQ Fusion 8000 fusion-bonded epoxy powder coating (FBE) 5-9 mils dry film thickness (DFT). The exterior coating is Fusion 8000 FBE+EXT Fusion super durable polyester powder coating (SDP) 6-10 mils DFT. All coatings are baked-on formulation applied over an SP10 surface preparation. Coatings are NSF/ANSI 61 approved. Available exterior colors are white, tan, light gray, light green, and light blue. Custom colors may be used.

Ring Wall. Ring wall, turned down slab, structural mat, or base setting ring foundation design drawings and engineering calculations to include a CA P.E. stamp, or appropriate jurisdiction. Additionally, piers, pilings, or appurtenances may be required due to unsuitable soil conditions.

| Tank Accessories Description | QTY. |
| --- | --- |
| 24" Diameter Shell Manway with Bolt on Hinged Cover | 1 |
| 20" Diameter Center Dome | 1 |
| 24" Combination Manway/Pressure Relief Valve +3/−1 Oz./In.² | 1 |
| 3" Diameter 3000# NPT Full Coupling with Plug Mounted in Flange and Bolted to Tank Sidewall | 1 |
| 1" Diameter 3000# NPT Full Coupling with Plug Mounted in Flange and Bolted to Top Tank Deck | 5 |
| 8" Diameter 150# RFSO Single Flanged Nozzles Located in Sidewall for Inlet, Outlet, and Overflow | 3 |
| Grounding Lugs | 4 |
| Partial Deck Perimeter Guardrail Assembly-10' Each Side of Ladder OSHA-HDG | 1 |
| External System Ladder with Personal Fall Prevention and Safety Gate at Eave-Cage and Rest Platform Excluded-HDG-meets OSHA 2018 Requirements | 1 |
| Electronic Drawings | 1 |

| Tank Design Description |
| --- |
| Seismic Loads per AWWA D103-09-Ss = 74.70%, S1 = 27.90%, Site Class = D, Use Group = 1, 1e = 1.00 |
| Wind Loads per AWWA D103-97-Velocity = 100 mph, Category = 3, Exposure C, I-1.00 |
| Ground Snow Load-20.8 lb./s.f. |
| Roof Live Load 15 lb./s.f. |
| Designed for Wastewater with Specific Gravity 1.05 |
| Product pH-4 to 9 |
| Design Pressure/Vacuum-+2.89/0.57 Oz./In.2 |
| Operating Pressure/Vacuum-+2.31/0.57 Oz./In.2 |
| Design Temperature-100° F. |
| Operating Temperature-Ambient |
| Seismic Loads per AWWA D103-09-Ss = 74.70%, S1 = 27.90%, Site Class = D, Use Group = 1, 1e = 1.00 |
| Wind Loads per AWWA D103-97-Velocity = 100 mph, Category = 3, Exposure: C, I = 1.00 |
| Ground Snow Load-20.8 lb./s.f. |

The tank will be filled with 73 m3 of media that may vary depending on treatment goals. The biofilm carrier fill fraction is 40%. An external pumping apparatus is used to mix the anaerobic tank by pumping the water from near the bottom of the tank back to near the top of the tank where the water is discharged through a series of nozzles and a header to enhance mixing within the tank. Appropriate screening is provided to retain the media and monitoring sensors for pH, temperature, ORP, or any other parameter as needed.

OxyShark® Unit Aerobic Treatment. The aerobic polishing treatment system consists of six 10' L×4' W×7' H aluminum tanks. The body of the modular tanks is constructed from 3/16" thick 5052-H32 aluminum alloy plate joined by arc welding, with required fillets for the joint involved. All welds are continuous, watertight, and conform to American Welding Society (AWS) D1.2 structural welding code for aluminum. The tank walls are reinforced and supported by 6061-T6 aluminum alloy extruded structural profiles as appropriate. Each tank has a sealable top constructed of 3/16" 5052-H32 aluminum alloy plate. The top provides virtually an airtight seal with the main tank body. The seal between the tank top and the tank body is ¼" Viton. The tank is fitted with appropriate pressure relief devices and/or carbon packed venting to reduce odor and control the internal pressure of the treatment tank. All surfaces of the tank and top exposed to atmosphere will be coated in a 3-7 mil DFT coating of PPG PSX 700 marine grade siloxane coating or equivalent.

Each modular tank is filled to 80% by volume with fixed-film bioreactor media providing 68 ft2/ft3 of surface area. The media void space is 96%. The media is supported by injection molded recycled plastic decking capable of supporting loads up to 60 tonnes/m2 for 48 hours.

Diffuser membranes are flexible silicone elastomer with a density of 1.18 grams per cubic centimeter (g/cm3). The slit size in the membrane does not exceed 0.6 millimeters (mm). The flux rate is equal to or less than 8.45 standard cubic feet per hour per square foot (SCFH/ft2) of diffuser membrane.

The diffusers are be positioned and sized to evenly distribute oxygen or air throughout the bioreactor tank.

The diffusers are designed to operate with 90-98% high purity oxygen at pressures up to 5 pounds per square inch gauge (psig). Nominal operating pressure is 3 psig. Membranes shall be periodically "flexed" at 5 psig for flushing and purge purposes and is a programmed function of the OxyShark® unit controller.

An electrical control panel is provided within a NEMA 4 rated dust tight enclosure. The control console is a PLC with touch screen HMI. The control console allows for timed operation of diffusers, oxygen generators, compressor, and pumps. All components are programmable, and the motors connected to the control panel are provided with HAND/AUTO/OFF capability.

The clarifier consists of an epoxy-coated carbon steel tank, approximately 13' L×7' W×18.5' H, with ortho FRP settling plates and PVC stiffeners, 304 SS hardware. The plate area is 570 ft2 with an effective settling area of 570 ft2. The design loading rate is 0.30 gpm/ft2. The sludge hopper has a capacity of 626 gallons. The clarifier is designed for Seismic Zone 4.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

It is claimed:

1. An anaerobic and aerobic treatment system for landfill condensate to reduce the amount of pollutants in the condensate to at least less than 500 mg/L BOD and 2,000 mg/L COD, the system comprising:
    (a) providing a means for moving the condensate to an equalization tank;
    (b) providing a means for moving the condensate from the equalization tank to an anaerobic treatment reactor;
    (c) the anaerobic treatment reactor includes a tank having (i) bio-growth media comprising a plurality of units having a surface area to volume ratio of about 100 to 230 ft$^2$/ft$^3$ which fill the anaerobic tank in the range of 30 to 50% by volume, and (ii) a mixing system comprising a plurality of mixing nozzles vertically aligned on the anaerobic tank to mix the condensate, wherein the influent condensate is treated in the anaerobic tank for about at least 60 hours at a temperature of about 25° to 57° C. until the condensate pollutant level is reduced to at least about 2,500 mg/L BOD and 5,000 mg/L COD and the anaerobic treated condensate is then moved to an aerobic treatment reactor for further treatment;
    (d) the aerobic treatment reactor comprising a plurality of aerobic treatment modular tanks connected together, wherein at least one of the plurality of aerobic treatment modular tanks comprises an enclosed tank utilizing a continuous channel plug flow process for treating the condensate and providing a treated effluent condensate, the enclosed tank having a bottom wall, side walls, a first end wall, a second end wall and a cover providing access to the inside of the enclosed tank, the cover is adapted to enclose the tank to keep nearly pure oxygen enclosed in the enclosed tank when in operation to provide for a fully aerobic system, the enclosed tank having an inlet pipe for receiving the condensate and an outlet pipe for discharging the condensate to another of the plurality of aerobic treatment modular tanks, the enclosed tank including a baffle providing for two separate compartments in the enclosed tank and there is a vertical opening at an end of the baffle, the baffle and the vertical opening therein are adapted to provide for continuous plug flow movement of the condensate through each of the two compartments of the enclosed tank wherein the plug flow movement of the condensate comprises a path for continuous flow of the condensate through the vertical opening of the baffle, the plug flow movement comprising a length to width ratio through the aerobic treatment reactor of about 8:1 to about 12:1;
    (i) each of the plurality of the aerobic treatment modular tanks having two separate compartments having at the bottom of each of the compartments an oxygen diffuser and scour/sludge removal system adapted to diffuse the nearly pure oxygen to oxygen diffusers and to diffuse air to scour/sludge diffusers to clean an attached growth media and further including the attached growth media for treating the condensate constructed and arranged above the oxygen diffuser and scour/sludge removal system and substantially filling each of the compartments;
    (ii) a source of nearly pure oxygen connected to the oxygen diffusers for treating the condensate and a source of air connected to the scour/sludge removal diffusers for cleaning the attached growth media;
    (iii) wherein the condensate enters a first modular tank and flows through at least two of the plurality of modular tanks with the continuous plug flow movement and is treated by the attached growth media and the nearly pure oxygen in the fully aerobic system, and the treated effluent condensate exits the first modular tank through a discharge pipe in the tank for discharging the treated effluent discharge condensate, wherein the condensate is treated in the aerobic reactor for about at least 60 hours until the treated condensate has a BOD of less than 500 mg/L and a COD of less than 2,000 mg/L;
    (e) optionally further treating the condensate in a clarifier tank; and
    (f) optionally further treating the condensate in an ozone treatment tank.

2. The system of claim 1 wherein the plurality of nozzles comprises four nozzles spaced substantially equidistant from each other from the top of the tank to the bottom of the tank.

3. The system of claim 1 wherein the aerobic treatment reactor comprises six modular tanks wherein a first two of the modular tanks comprise a first train for treating the condensate, a second two of the modular tanks comprise a second train for treating the condensate and a third two of the modular tanks comprise a third train for treating the condensate wherein the treated effluent discharge condensate exits the first train and enters the second train for further treatment and the further treated effluent discharge condensate exits the second train and enters the third train for further treatment and the further treated effluent discharge condensate exits the third train.

4. The system of claim 1 wherein the oxygen diffuser and scour/sludge removal system comprise an oxygen header for receiving the oxygen for diffusing through oxygen diffuser tubes and a scour/sludge removal header for receiving air for diffusing air through scour/sludge diffuser tubes for cleaning the attached growth media.

5. The system of claim 1 wherein the attached growth media has a minimum surface to volume ratio of about 30 $ft^2/ft^3$.

6. The system of claim 1 wherein the attached growth media has a surface to volume ratio in the range of about 48 to 70 $ft^2/ft^3$.

7. The system of claim 1 wherein the scour/diffuser tubes are adapted to receive suction air for removing debris from the tank.

8. The system of claim 1 wherein the bio-growth media fill the anaerobic tank in the range of 35-40% by volume.

9. A method for treating landfill condensate to reduce the amount of pollutants in the condensate to at least less than 500 mg/L BOD and 2,000 mg/L COD, the method comprises a first anaerobic treatment of the condensate followed by an aerobic treatment of the condensate, the method comprising the steps of:
(a) moving the condensate to an equalization tank;
(b) moving the condensate from the equalization tank to an anaerobic treatment reactor;
(c) the anaerobic reactor includes a tank having (i) bio-growth media comprising a plurality of units having a surface area to volume ratio of about 100 to 230 $ft^2/ft^3$ which fill the anaerobic tank in the range of 30 to 50% by volume, and (ii) a mixing system comprising a plurality of mixing nozzles vertically aligned on the anaerobic tank to mix the condensate, wherein the influent condensate is treated in the anaerobic tank for about at least 60 hours at a temperature in the range of 25° to 57° C. until the condensate pollutant level is reduced to at least about 2,500 mg/L BOD and 5,000 mg/L COD and the anaerobic treated condensate is then moved to an aerobic treatment reactor for further treatment;
(d) the aerobic treatment reactor comprises a plurality of aerobic treatment modular tanks connected together, wherein at least one of the plurality of aerobic treatment modular tanks comprises an enclosed tank utilizing a continuous channel plug flow process for treating the condensate and providing a treated effluent condensate, the enclosed tank having a bottom wall, side walls, a first end wall, a second end wall and a cover providing access to the inside of the enclosed tank, the cover is adapted to enclose the tank to keep nearly pure oxygen enclosed in the enclosed tank when in operation to provide for a fully aerobic system, the enclosed tank having an inlet pipe for receiving the condensate and an outlet pipe for discharging the condensate to another of the plurality of aerobic treatment modular tanks, the enclosed tank including a baffle providing for two separate compartments in the enclosed tank and there is a vertical opening at an end of the baffle, the baffle and the vertical opening therein are adapted to provide for continuous plug flow movement of the condensate through each of the two compartments of the enclosed tank wherein the plug flow movement of the condensate comprises a path for continuous flow of the condensate through the vertical opening of the baffle, the plug flow movement comprising a length to width ratio through the aerobic reactor of about 8:1 to about 12:1;
(i) each of the plurality of the aerobic treatment modular tanks having two separate compartments have at the bottom of each of the compartments an oxygen diffuser and scour/sludge removal system adapted to diffuse the nearly pure oxygen to oxygen diffusers and to diffuse air to scour/sludge diffusers to clean the attached growth media and further including attached growth media for treating the condensate constructed and arranged above the oxygen diffuse and scour/sludge removal system and substantially filling each of the compartments;
(ii) a source of nearly pure oxygen connected to the oxygen diffusers for treating the condensate and a source of air connected to the scour/sludge removal diffusers for cleaning the attached growth media;
(iii) wherein the condensate enters a first modular tank and flows through at least two of the plurality of modular tanks with the continuous plug flow movement and is treated by the attached growth media and the nearly pure oxygen in the fully aerobic system, and the treated effluent condensate exits the first modular tank through a discharge pipe in the tank for discharging the treated effluent discharge condensate, wherein the condensate is treated in the aerobic reactor for about at least 60 hours until the treated condensate has a BOD of less than 500 mg/L and a COD of less than 2,000 mg/L;
(e) optionally moving the treated condensate from the aerobic reactor to a clarifier tank for further treatment; and
(f) optionally moving the treated condensate from the clarifier tank to an ozone treatment tank for further treatment.

10. The method of claim 9 wherein the plurality of nozzles comprises four nozzles spaced substantially equidistant from each other from the top of the tank to the bottom of the tank.

11. The method of claim 9 wherein the aerobic treatment reactor comprises six modular tanks wherein a first two of the modular tanks comprise a first train for treating the condensate, a second two of the modular tanks comprise a second train for treating the condensate and a third two of the modular tanks comprise a third train for treating the condensate wherein the treated effluent discharge condensate exits the first train and enters the second train for further treatment and the further treated effluent discharge condensate exits the second train and enters the third train for further treatment and the further treated effluent discharge condensate exits the third train.

12. The method of claim 9 wherein the oxygen diffuser and scour/sludge removal system comprise an oxygen header for receiving the oxygen for diffusing through oxygen diffuser tubes and a scour/sludge removal header for receiving air for diffusing air through scour/sludge diffuser tubes for cleaning the attached growth media.

13. The method of claim 9 wherein the attached growth media has a minimum surface to volume ratio of about 30 $ft^2/ft^3$.

14. The method of claim 9 wherein the attached growth media has a surface to volume ratio in the range of about 48 to 70 $ft^2/ft^3$.

15. The method of claim 9 wherein the scour/diffuser tubes are adapted to receive suction air for removing debris from the tank.

16. The method of claim 9 wherein the bio-growth media fill the anaerobic tank in the range of 35-40% by volume.

17. An anaerobic and aerobic treatment system for landfill condensate to reduce the amount of pollutants in the condensate to at least less than 500 mg/L BOD and 2,000 mg/L COD, the system comprising:
 (a) providing a means for moving the condensate to an equalization tank;
 (b) providing a means for moving the condensate from the equalization tank to an anaerobic treatment reactor;
 (c) the anaerobic reactor includes a tank having (i) bio-growth media, and (ii) a mixing system, wherein the influent condensate is treated in the anaerobic tank until the condensate pollutant level is reduced to at least about 2,500 mg/L BOD and 5,000 mg/L COD and the anaerobic treated condensate is then moved to an aerobic treatment reactor for further treatment;
 (d) the aerobic treatment reactor comprising a plurality of aerobic treatment modular tanks connected together, wherein at least one of the plurality of aerobic treatment modular tanks comprises an enclosed tank utilizing a continuous channel plug flow process for treating the condensate and providing a treated effluent condensate, the enclosed tank having a cover providing access to the inside of the enclosed tank, the cover is adapted to enclose the tank to keep nearly pure oxygen enclosed in the enclosed tank when in operation to provide for a fully aerobic system, the enclosed tank including a baffle providing for two separate compartments in the enclosed tank and there is a vertical opening at an end of the baffle in the enclosed tank, the baffle and the vertical opening therein are adapted to provide for continuous plug flow movement of the condensate through each of the two compartments of the enclosed tank wherein the plug flow movement of the condensate comprises a path for continuous flow of the condensate through the vertical opening of the baffle;
  (i) each of the plurality of the aerobic treatment modular tanks having two separate compartments having at the bottom of each of the compartments an oxygen diffuser and scour/sludge removal system adapted to diffuse the nearly pure oxygen to oxygen diffusers and to diffuse air to scour/sludge diffusers to clean an attached growth media and further including the attached growth media for treating the condensate constructed and arranged above the oxygen diffuser and scour/sludge removal system and substantially filling each of the compartments;
  (ii) a source of nearly pure oxygen connected to the oxygen diffusers for treating the condensate and a source of air connected to the scour/sludge removal diffusers for cleaning the attached growth media;
  (iii) wherein the condensate enters a first modular tank and flows through the two compartments of at least two of the plurality of modular tanks with the continuous plug flow movement and is treated by the attached growth media and the nearly pure oxygen, the treated effluent condensate exits the first modular tank for discharging the treated effluent discharge condensate, wherein the condensate is treated in the aerobic reactor until the treated condensate has a BOD of less than 500 mg/L and a COD of less than 2,000 mg/L;
 (e) optionally further treating the condensate in a clarifier tank; and
 (f) optionally further treating the condensate in an ozone treatment tank.

18. The system of claim 17 wherein the aerobic treatment reactor comprises six modular tanks wherein a first two of the modular tanks comprise a first train for treating the condensate, a second two of the modular tanks comprise a second train for treating the condensate and a third two of the modular tanks comprise a third train for treating the condensate wherein the treated effluent discharge condensate exits the first train and enters the second train for further treatment and the further treated effluent discharge condensate exits the second train and enters the third train for further treatment and the further treated effluent discharge condensate exits the third train.

19. The system of claim 17 wherein the oxygen diffuser and scour/sludge removal system comprise an oxygen header for receiving the oxygen for diffusing through oxygen diffuser tubes and a scour/sludge removal header for receiving air for diffusing air through scour/sludge diffuser tubes for cleaning the attached growth media.

20. The system of claim 17 wherein the scour/diffuser tubes are adapted to receive suction air for removing debris from the tank.

* * * * *

UNITED STATES PATENT AND TRADEMARK OFFICE
CERTIFICATE OF CORRECTION

PATENT NO. : 11,535,545 B2
APPLICATION NO. : 17/170486
DATED : December 27, 2022
INVENTOR(S) : A. Frank McFadden It is certified that error appears in the above-identified patent and that said Letters Patent is hereby corrected as shown below:

In the Claims

Claim 1, Column 17, Line 48, "(a) providing a means for moving" should read -- (a) a means for moving --.

Claim 1, Column 17, Line 50, "(b) providing a means for moving" should read -- (b) a means for moving --.

Claim 1, Column 17, Line 59, "the influent condensate is treated in the anaerobic tank" should read -- the anaerobic treatment reactor is capable to treat the influent condensate --.

Claim 1, Column 18, Lines 48-49, "wherein the condensate is treated is treated in the aerobic reactor" should read -- wherein the aerobic treatment reactor is capable to treat the condensate --.

Claim 1, Column 18, Lines 52-53, "(e) optionlly further treating the condensate in a clarifier tank;" should read -- (e) optionally further comprising a clarifier tank for further treating the condensate; --.

Claim 1, Column 18, Lines 54-55, "(f) optionlly further treating the condensate in an ozone treatment tank;" should read -- (f) optionally further comprising an ozone treatment tank for further treating the condensate; --.

Claim 9, Column 19, Line 31, "(c) the anaerobic reactor includes a tank" should read -- "c) wherein the anaerobic reactor includes a tank --.

Claim 9, Column 19, Line 45, "(d) the aerobic treatment reactor comprises" should read -- (d) wherein the aerobic treatment reactor comprises --.

Claim 17, Column 21, Line 7, "(a) providing a means for moving" should read -- (a) a means for moving --.

Signed and Sealed this
Twenty-seventh Day of February, 2024

Katherine Kelly Vidal
*Director of the United States Patent and Trademark Office*

Claim 17, Column 21, Line 9, "(b) providing a means for moving" should read -- (b) a means for moving --.

Claim 17, Column 21, Lines 12-13, "wherein the influent condensate is treated in the anaerobic tank until" should read -- wherein the anaerobic reactor is capable to treat the influent condensate --.

Claim 17, Column 22, Lines 16-17, "wherein the condensate is treated in the aerobic reactor" should read -- wherein the aerobic treatment reactor is capable to treat the condensate --.

Claim 17, Column 22, Lines 20-21, "(e) optionally further treating the condensate in a clarifier tank; and" should read -- (e) optionally further comprising a clarifier tank for further treating the condensate; and --.

Claim 17, Column 22, Lines 22-23, "(f) optionally further treating the condesate in an ozone treatment tank." should read -- (f) optionally further comprising an ozone treatment tank for further treating the condensate. --.